US008777744B2

(12) United States Patent
Basallo et al.

(10) Patent No.: US 8,777,744 B2
(45) Date of Patent: Jul. 15, 2014

(54) GAMING SYSTEM AND METHOD CONFIGURED TO PROVIDE A MUSICAL GAME ASSOCIATED WITH UNLOCKABLE MUSICAL INSTRUMENTS

(71) Applicant: IGT, Reno, NV (US)

(72) Inventors: Leandro Basallo, San Francisco, CA (US); Scott A. Caputo, Santa Clara, CA (US); Walter B. Scharold, Oakland, CA (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/625,936

(22) Filed: Sep. 25, 2012

(65) Prior Publication Data

US 2014/0087878 A1    Mar. 27, 2014

(51) Int. Cl.
*A63F 9/24*    (2006.01)
(52) U.S. Cl.
USPC ................................... 463/35; 463/7; 463/36
(58) Field of Classification Search
USPC ........................................................... 463/35
See application file for complete search history.

(56) References Cited

U.S. PATENT DOCUMENTS

| | | |
|---|---|---|
| 6,174,235 B1 | 1/2001 | Walker et al. |
| 6,309,300 B1 | 10/2001 | Glavich |
| 6,315,664 B1 | 11/2001 | Baerlocher et al. |
| 6,319,124 B1 | 11/2001 | Baerlocher et al. |
| 6,364,767 B1 | 4/2002 | Brossard et al. |
| 6,439,995 B1 | 8/2002 | Hughs-Baird et al. |
| 6,450,883 B1 | 9/2002 | O'Halloran |
| 6,511,375 B1 | 1/2003 | Kaminkow |
| 6,514,141 B1 | 2/2003 | Kaminkow et al. |
| 6,558,254 B2 | 5/2003 | Baelocher et al. |
| 6,561,899 B2 | 5/2003 | Vancura |
| 6,561,902 B1 | 5/2003 | Walker et al. |
| 6,561,908 B1 | 5/2003 | Hoke |

(Continued)

FOREIGN PATENT DOCUMENTS

RU    2005110657    9/2005

OTHER PUBLICATIONS

"Bally Technologies Earns Five of 10 Slot Floor Technology Awards," including description of All that Jazz, Bally Technologies, available at http://news.ballytech.com/press-release/awards/bally-technologies-earns-five-10-slot-floor-technology-awards, printed Sep. 26, 2012 (2 pages).

(Continued)

*Primary Examiner* — Tramar Harper
(74) *Attorney, Agent, or Firm* — Neal, Gerber & Eisenberg LLP

(57) ABSTRACT

Various embodiments of the present disclosure are directed to gaming systems and methods configured to provide a musical game associated with unlockable musical instruments. In one embodiment, the musical game is associated with a plurality of different musical instruments that are initially unlocked or locked and a plurality of different instrument playing events, each of which is associated with one or more of the musical instruments. Upon an occurrence of one of the instrument playing events, the gaming system produces at least one sound and provides an award associated with each unlocked musical instrument associated with that instrument playing event. The gaming system does not produce any sounds or provide any awards associated with any locked musical instruments associated with that instrument playing event. Upon an occurrence of an instrument unlock event, if any of the musical instruments are locked, the gaming system unlocks at least one locked musical instrument.

26 Claims, 24 Drawing Sheets

(56) References Cited

U.S. PATENT DOCUMENTS

| | | |
|---|---|---|
| 6,582,307 B2 | 6/2003 | Webb |
| 6,595,854 B2 | 7/2003 | Hughs-Baird et al. |
| 6,599,185 B1 | 7/2003 | Kaminkow et al. |
| 6,602,137 B2 | 8/2003 | Kaminkow et al. |
| 6,609,971 B2 | 8/2003 | Vancura |
| 6,656,046 B1 | 12/2003 | Yoseloff et al. |
| 6,676,516 B2 | 1/2004 | Baerlocher et al. |
| 6,692,356 B2 | 2/2004 | Baerlocher et al. |
| 6,722,981 B2 | 4/2004 | Kaminkow et al. |
| 6,722,982 B2 | 4/2004 | Kaminkow et al. |
| 6,729,618 B1 | 5/2004 | Koenig et al. |
| 6,733,386 B2 | 5/2004 | Cuddy et al. |
| 6,739,973 B1 | 5/2004 | Lucchesi et al. |
| 6,749,504 B2 | 6/2004 | Hughs-Baird |
| 6,769,983 B2 | 8/2004 | Slomiany |
| 6,769,985 B1 | 8/2004 | Laakso et al. |
| 6,780,107 B2 | 8/2004 | Baerlocher et al. |
| 6,783,457 B2 | 8/2004 | Hughs-Baird et al. |
| 6,817,944 B2 | 11/2004 | Kaminkow et al. |
| 6,843,721 B2 | 1/2005 | Vancura |
| 6,843,722 B2 | 1/2005 | Webb |
| 6,848,996 B2 | 2/2005 | Hecht |
| 6,852,028 B2 | 2/2005 | Vancura |
| 6,875,108 B1 | 4/2005 | Hughs-Baird |
| 6,877,745 B1 | 4/2005 | Walker et al. |
| 6,899,620 B2 | 5/2005 | Kaminkow et al. |
| 6,913,533 B2 | 7/2005 | Cuddy et al. |
| 6,918,834 B2 | 7/2005 | Vancura |
| 6,932,701 B2 | 8/2005 | Glavich et al. |
| 6,935,955 B1 | 8/2005 | Kaminkow et al. |
| 6,958,013 B2 | 10/2005 | Miereau et al. |
| 6,966,833 B2 | 11/2005 | Kaminkow et al. |
| 7,004,834 B2 | 2/2006 | Walker et al. |
| 7,037,191 B2 | 5/2006 | Rodgers et al. |
| 7,040,984 B2 | 5/2006 | Mead |
| 7,056,214 B2 | 6/2006 | Miereau et al. |
| 7,104,888 B2 | 9/2006 | Miereau et al. |
| 7,105,736 B2 | 9/2006 | Laakso |
| 7,112,137 B2 | 9/2006 | Baerlocher et al. |
| 7,121,942 B2 | 10/2006 | Baerlocher |
| 7,160,186 B2 | 1/2007 | Cuddy et al. |
| 7,160,188 B2 | 1/2007 | Kaminkow et al. |
| 7,172,506 B2 | 2/2007 | Baerlocher et al. |
| 7,182,689 B2 | 2/2007 | Hughs-Baird et al. |
| 7,235,011 B2 | 6/2007 | Randall et al. |
| 7,241,219 B2 | 7/2007 | Walker et al. |
| 7,247,096 B2 | 7/2007 | Vancura |
| 7,258,613 B2 | 8/2007 | Lucchesi et al. |
| 7,264,545 B2 | 9/2007 | Maya et al. |
| 7,273,415 B2 | 9/2007 | Cregan et al. |
| 7,300,348 B2 | 11/2007 | Kaminkow et al. |
| 7,303,469 B2 | 12/2007 | Kaminkow |
| 7,314,409 B2 | 1/2008 | Maya et al. |
| 7,316,609 B2 | 1/2008 | Dunn et al. |
| 7,338,367 B2 | 3/2008 | Kaminkow et al. |
| 7,338,369 B2 | 3/2008 | Mierau et al. |
| 7,351,141 B2 | 4/2008 | Rodgers et al. |
| 7,355,112 B2 | 4/2008 | Laakso |
| 7,371,174 B2 | 5/2008 | Baerlocher |
| 7,377,849 B2 | 5/2008 | Baerlocher et al. |
| 7,402,103 B2 | 7/2008 | Baerlocher |
| 7,413,510 B2 | 8/2008 | Schlegel et al. |
| 7,544,129 B2 | 6/2009 | Baerlocher |
| 7,547,252 B2 | 6/2009 | Peterson et al. |
| 7,566,267 B2 | 7/2009 | Vancura |
| 7,566,271 B2 | 7/2009 | Hostetler et al. |
| 7,578,736 B2 | 8/2009 | Baerlocher et al. |
| 7,585,218 B2 | 9/2009 | Mead et al. |
| 7,591,722 B2 | 9/2009 | Baerlocher et al. |
| 7,601,058 B2 | 10/2009 | Slomiany |
| 7,666,098 B2 | 2/2010 | Hecht et al. |
| 7,690,981 B2 | 4/2010 | Ching et al. |
| 7,708,642 B2 | 5/2010 | Hecht et al. |
| 7,726,655 B2 | 6/2010 | Walker et al. |
| 7,744,454 B2 | 6/2010 | Mierau et al. |
| 7,749,070 B2 | 7/2010 | Baerlocher et al. |
| 7,785,188 B2 | 8/2010 | Cannon |
| 7,789,748 B2 | 9/2010 | Landrum et al. |
| 7,806,760 B2 | 10/2010 | Baerlocher |
| 7,824,263 B2 | 11/2010 | Baerlocher |
| 7,833,095 B2 | 11/2010 | Cuddy et al. |
| 7,837,554 B2 | 11/2010 | Kaminkow et al. |
| 7,867,074 B2 | 1/2011 | Gerrard et al. |
| 7,871,327 B2 | 1/2011 | Walker et al. |
| 7,874,912 B2 | 1/2011 | Cregan et al. |
| 7,887,409 B2 | 2/2011 | Baerlocher et al. |
| 7,892,091 B2 | 2/2011 | Laakso et al. |
| 7,901,291 B2 | 3/2011 | Hecht et al. |
| 7,914,373 B2 | 3/2011 | Webb et al. |
| 7,942,737 B2 | 5/2011 | Cregan et al. |
| 7,963,841 B2 | 6/2011 | Baerlocher et al. |
| 7,976,382 B2 | 7/2011 | Benbrahim |
| 8,016,674 B2 | 9/2011 | Lucchesi et al. |
| 8,025,562 B2 | 9/2011 | Walker et al. |
| 8,025,566 B2 | 9/2011 | Walker et al. |
| 8,029,353 B2 | 10/2011 | Walker et al. |
| 8,029,362 B2 | 10/2011 | Walker et al. |
| 8,216,061 B2 | 7/2012 | Pacey |
| 2003/0073489 A1* | 4/2003 | Hecht et al. ............ 463/35 |
| 2003/0211881 A1 | 11/2003 | Walker et al. |
| 2005/0020351 A1 | 1/2005 | Baerlocher et al. |
| 2005/0054435 A1 | 3/2005 | Rodgers et al. |
| 2005/0054441 A1* | 3/2005 | Landrum et al. ........ 463/35 |
| 2005/0192081 A1 | 9/2005 | Marks et al. |
| 2006/0030401 A1 | 2/2006 | Mead et al. |
| 2006/0052157 A1 | 3/2006 | Walker et al. |
| 2006/0183528 A1 | 8/2006 | Rodgers et al. |
| 2007/0011718 A1 | 1/2007 | Nee |
| 2007/0105625 A1 | 5/2007 | Walker et al. |
| 2007/0117606 A1 | 5/2007 | Baerlocher et al. |
| 2007/0149267 A1 | 6/2007 | Ross et al. |
| 2007/0167221 A1 | 7/2007 | Walker et al. |
| 2008/0032789 A1 | 2/2008 | Walker et al. |
| 2008/0058075 A1 | 3/2008 | Walker et al. |
| 2008/0146321 A1 | 6/2008 | Parente |
| 2008/0188287 A1 | 8/2008 | Schlegel et al. |
| 2008/0305856 A1 | 12/2008 | Walker et al. |
| 2009/0104959 A1 | 4/2009 | Caputo et al. |
| 2009/0253492 A1 | 10/2009 | Caputo et al. |
| 2009/0318217 A1* | 12/2009 | Acres ..................... 463/20 |
| 2010/0004044 A1 | 1/2010 | Slomiany |
| 2010/0048282 A1 | 2/2010 | Nicely et al. |
| 2010/0062827 A1 | 3/2010 | Hoffman et al. |
| 2010/0120505 A1 | 5/2010 | Caputo et al. |
| 2011/0111831 A1 | 5/2011 | Seelig et al. |
| 2011/0183750 A1 | 7/2011 | Cregan et al. |
| 2012/0184362 A1* | 7/2012 | Barclay et al. .......... 463/25 |
| 2012/0244948 A1* | 9/2012 | Dhillon et al. .......... 463/42 |

OTHER PUBLICATIONS

Buchanan, Levi, "Tap Tap Dance iPhone Review," IGN.com, available at http://www.ign.com/articles/2008/12/11/tap-tap-dance-iphone-review, Dec. 11, 2008 (2 pages).

Clements, Ryan, "DanceDanceRevolution Review," IGN.com, available at http://www.ign.com/articles/2011/04/30/dancedancerevolution-review-3, Apr. 29, 2011 (3 pages).

Goldstein, Hilary, "Rock Band 2 Review," IGN.com, available at http://www.ign.com/articles/2008/09/12/rock-band-2-review-6?page=3, Sep. 12, 2008 (6 pages).

Hatfield, Daemon, "DJ Hero: Renegade Edition Review," IGN.com, available at http://www.ign.com/articles/2009/10/26/dj-hero-renegade-edition-review?page=2, Oct. 26, 2009 (7 pages).

Roper, Chris, "Guitar Hero," IGN.com, available at http://www.ign.com/articles/2005/11/03/guitar-hero, Nov. 2, 2005 (8 pages).

* cited by examiner

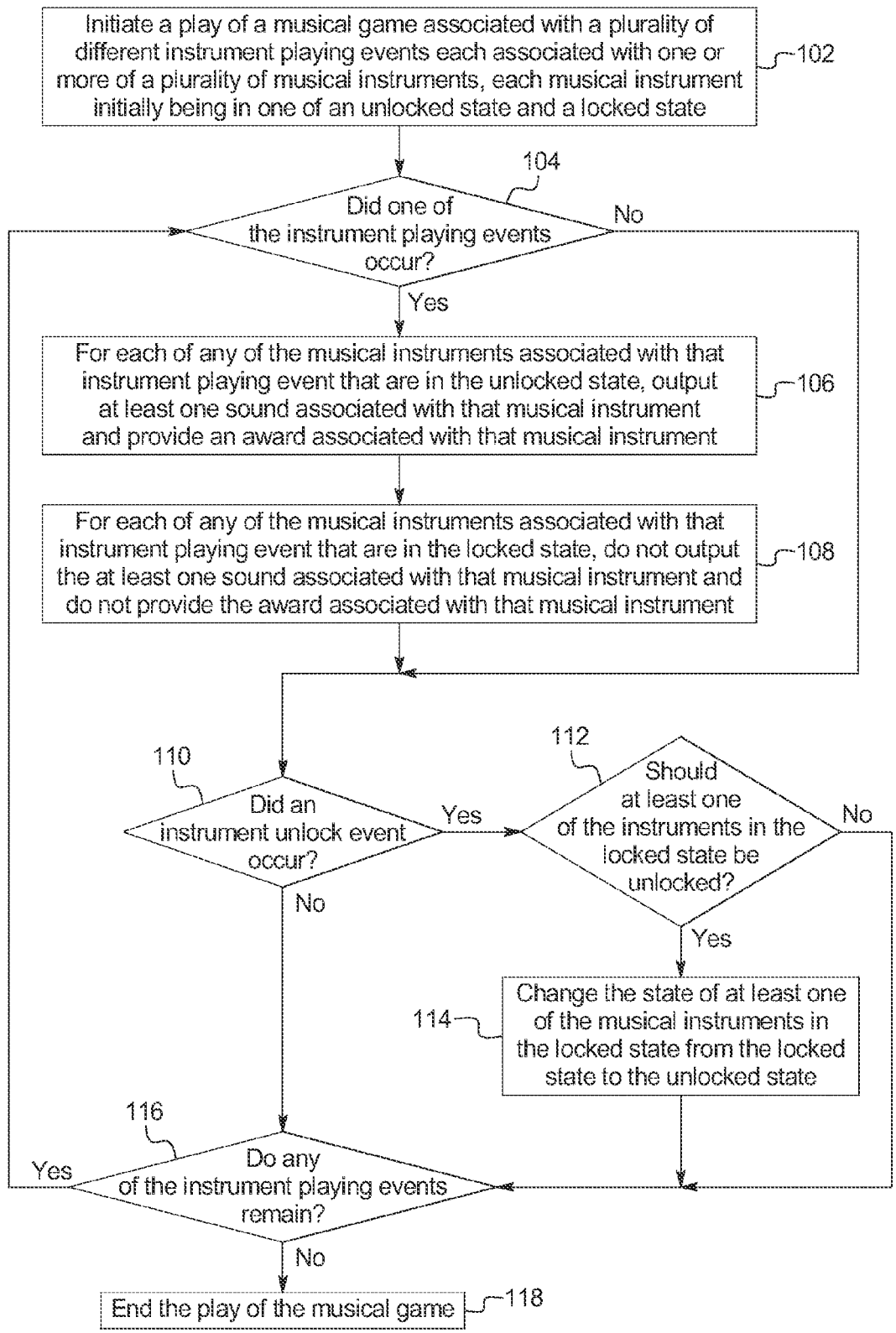

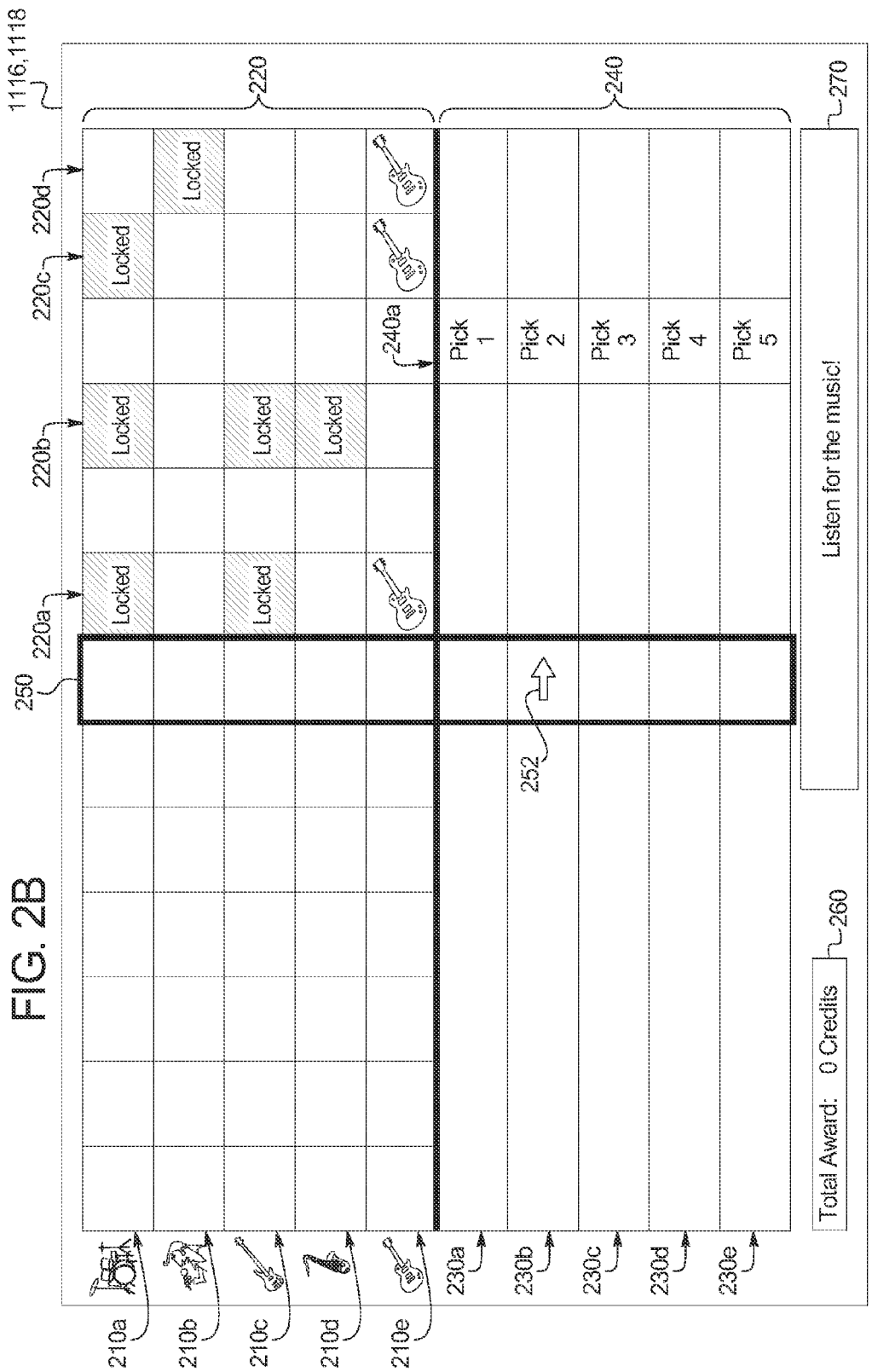

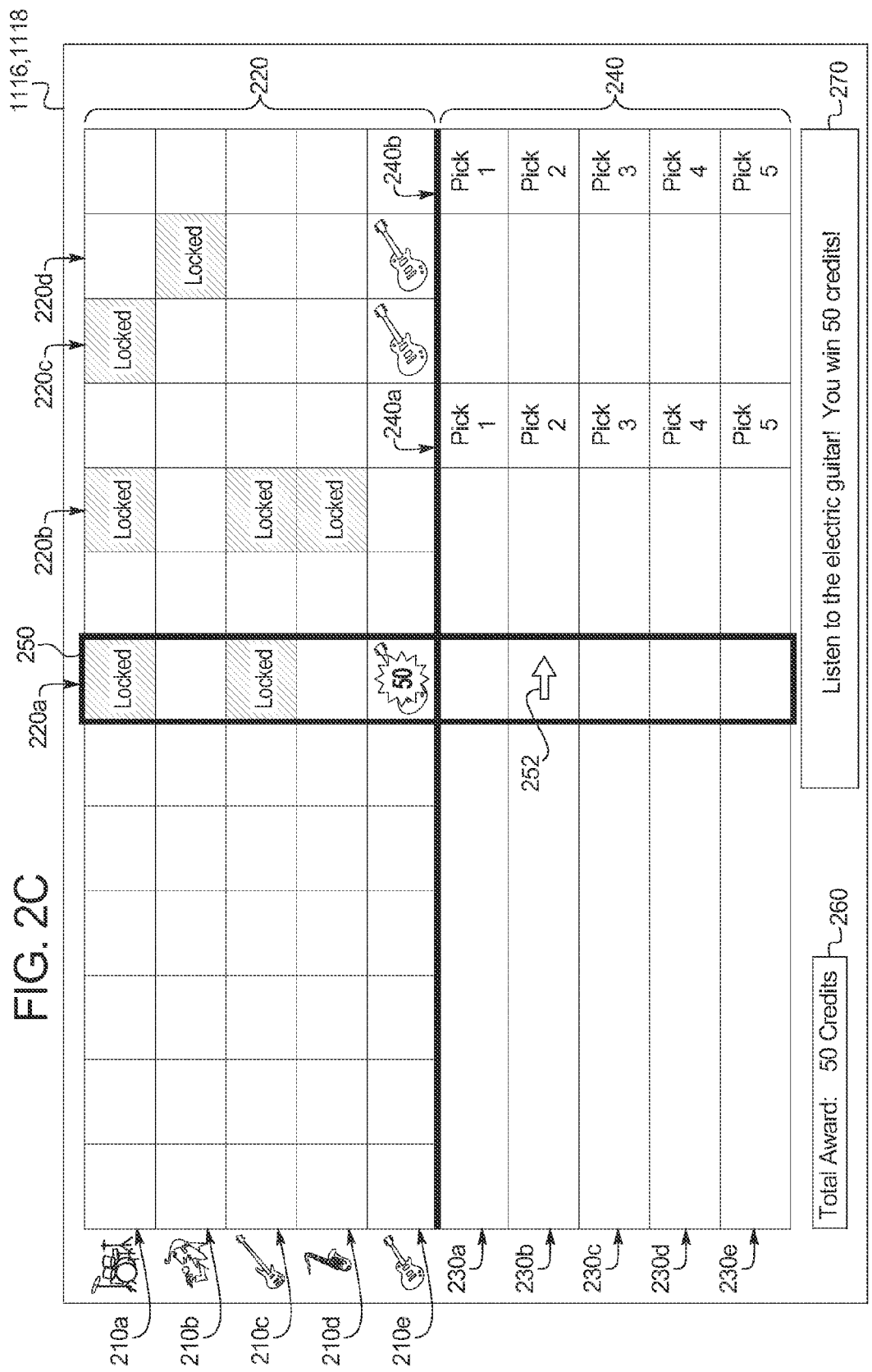

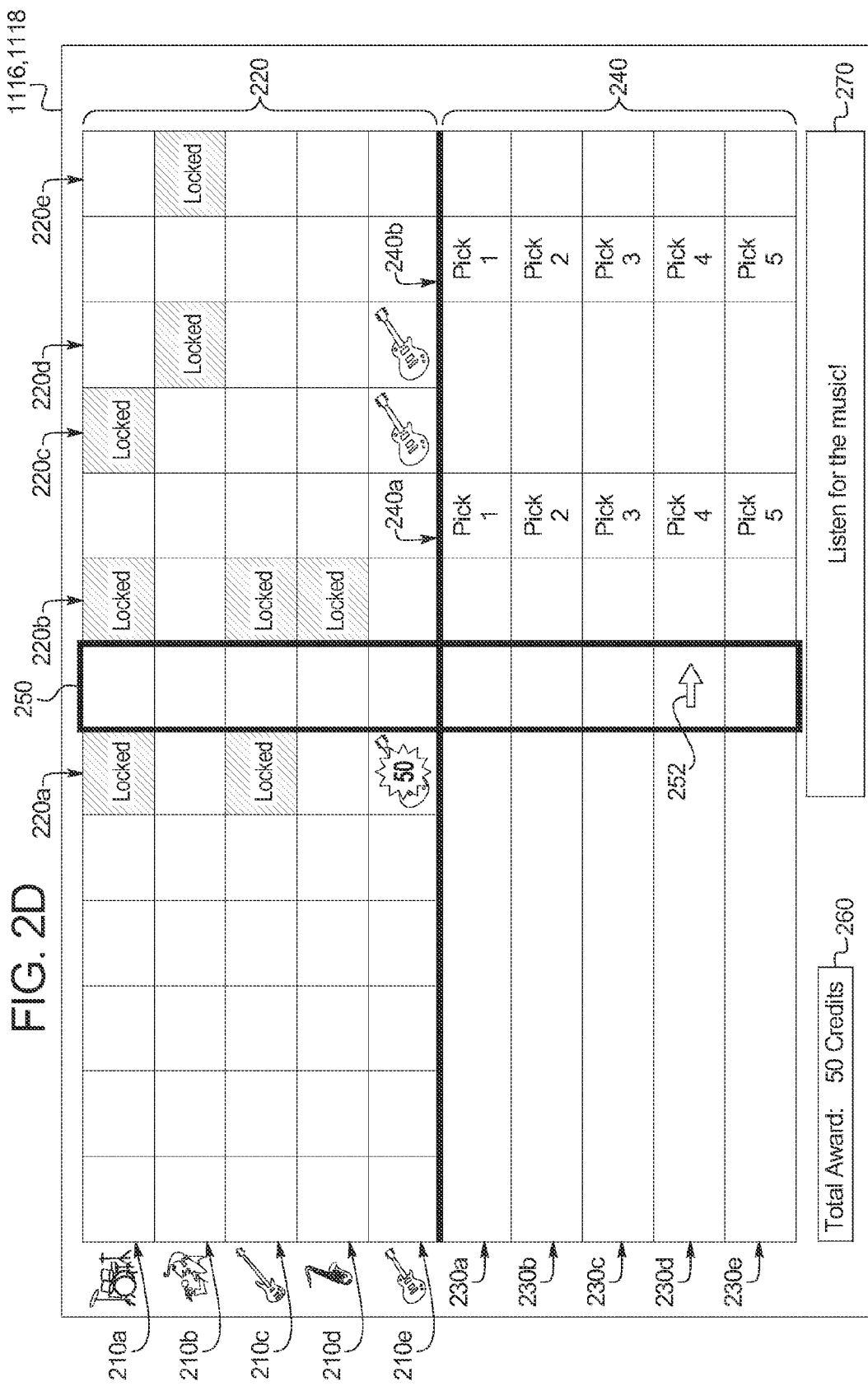

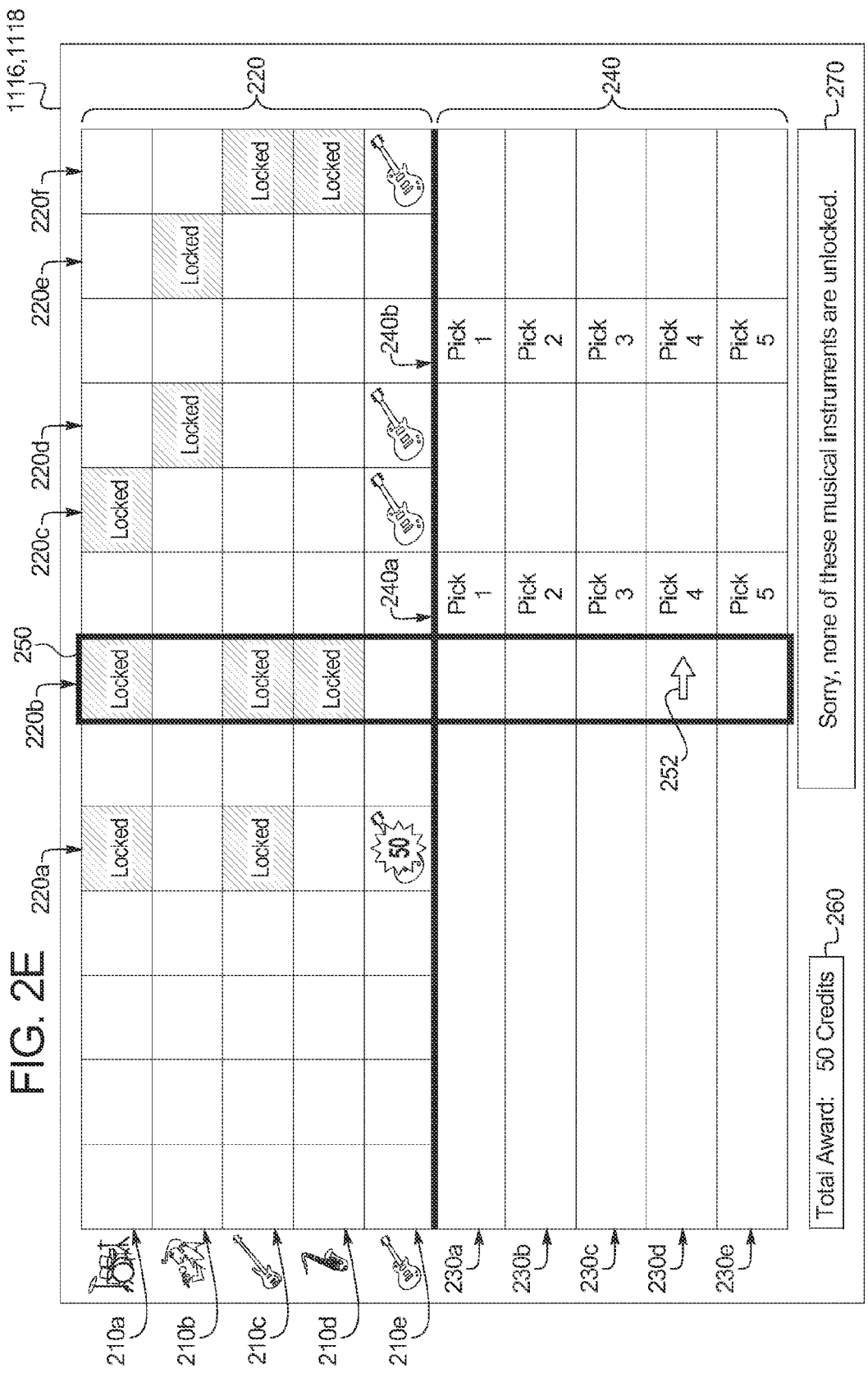

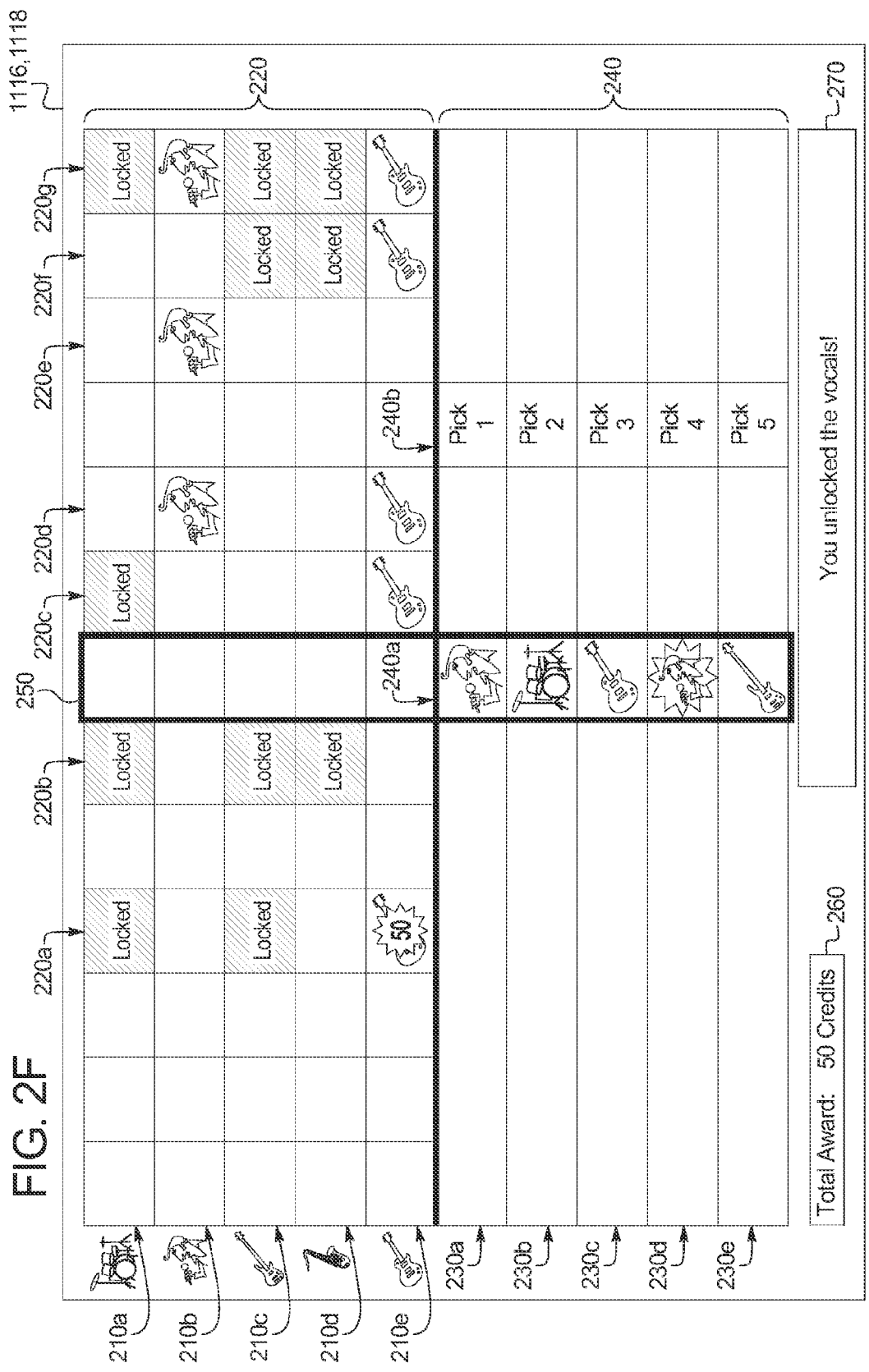

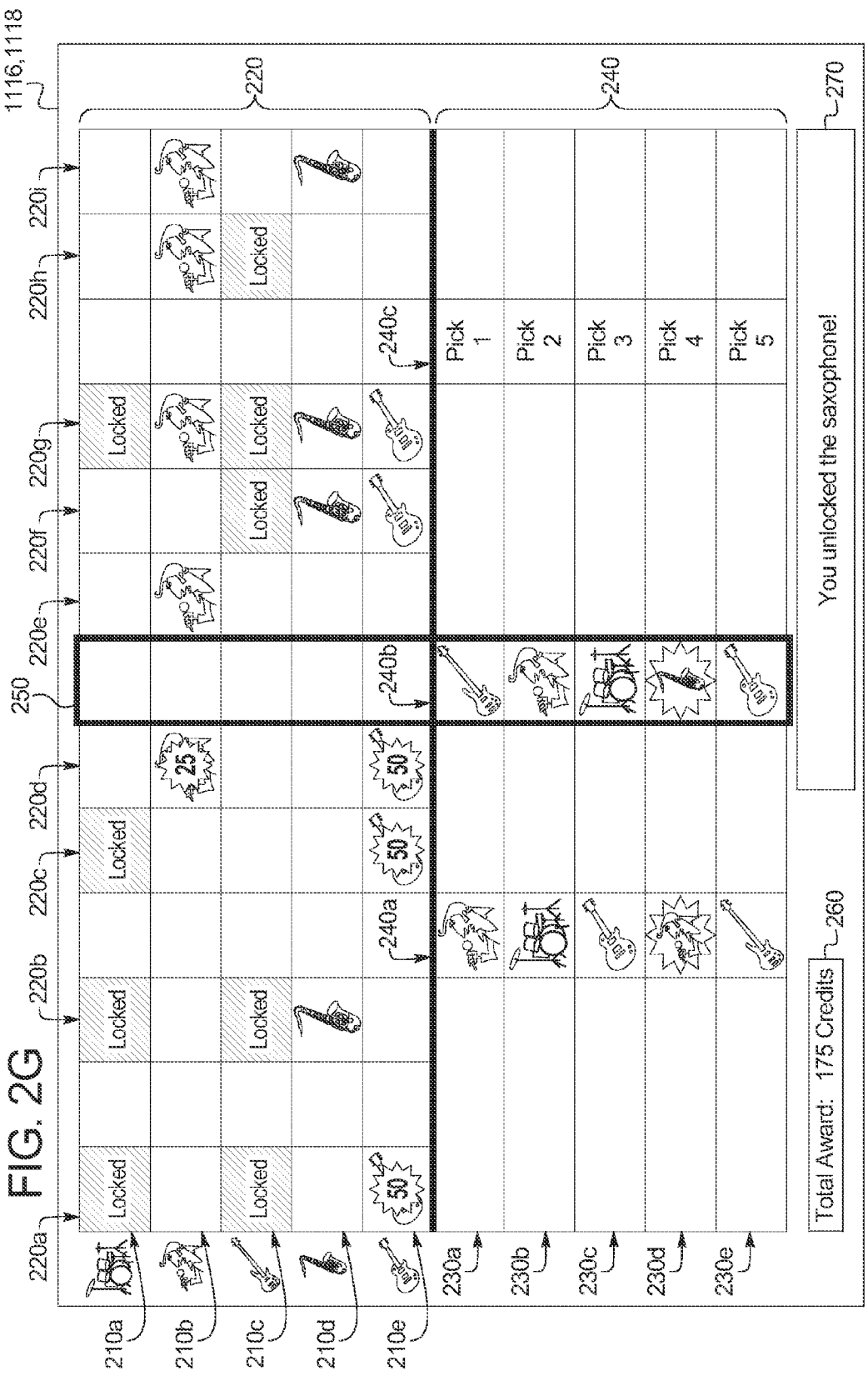

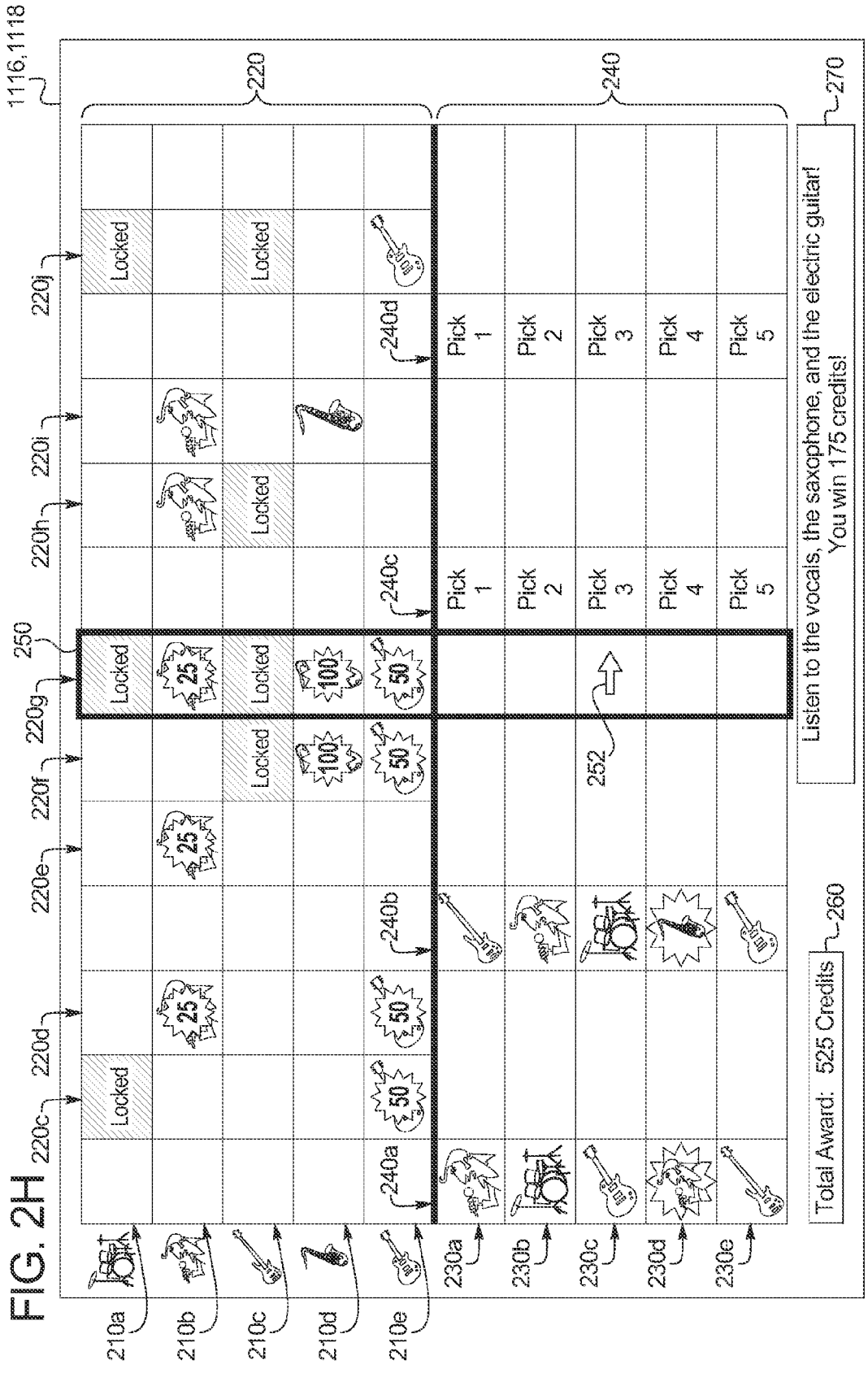

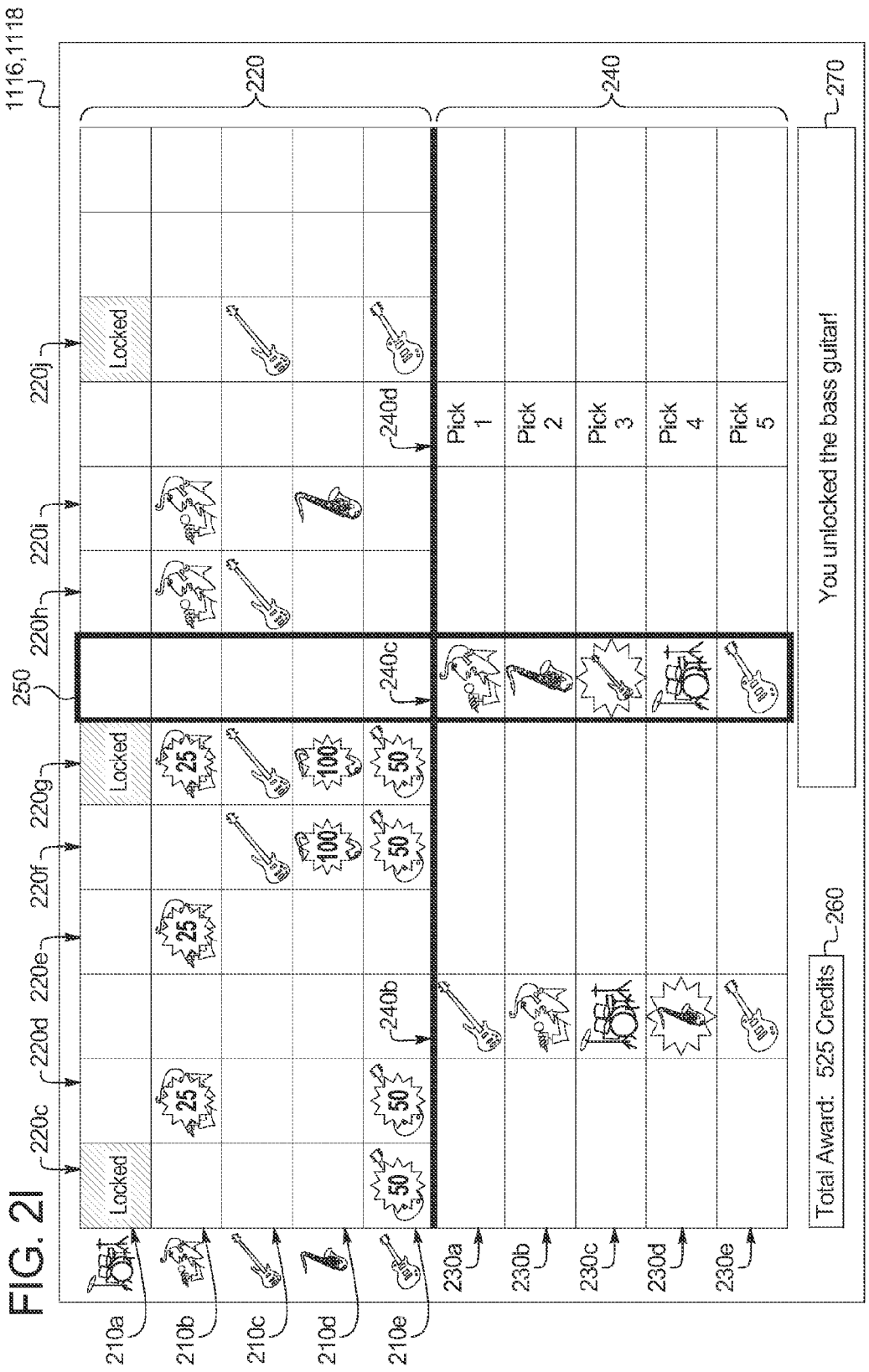

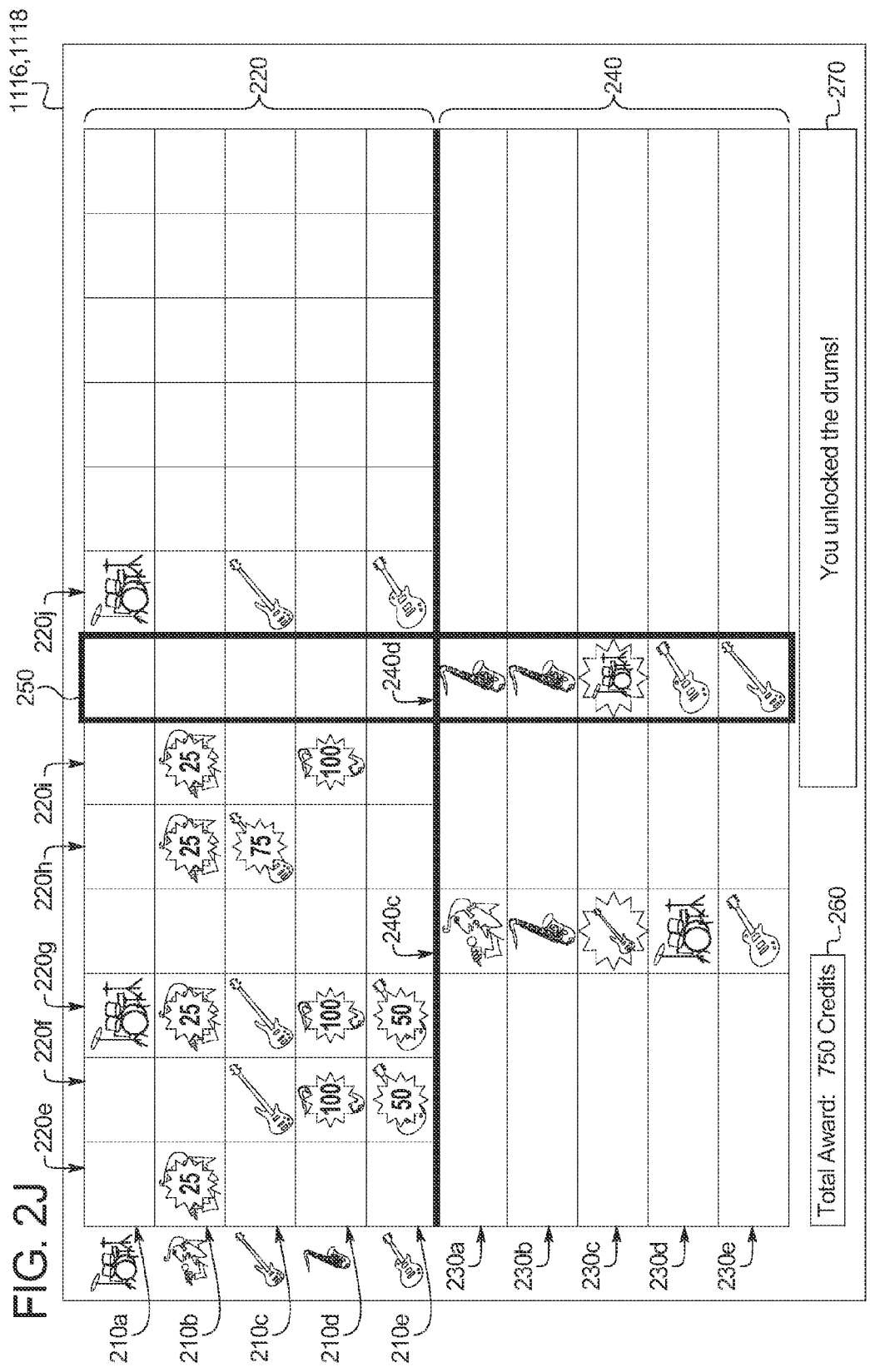

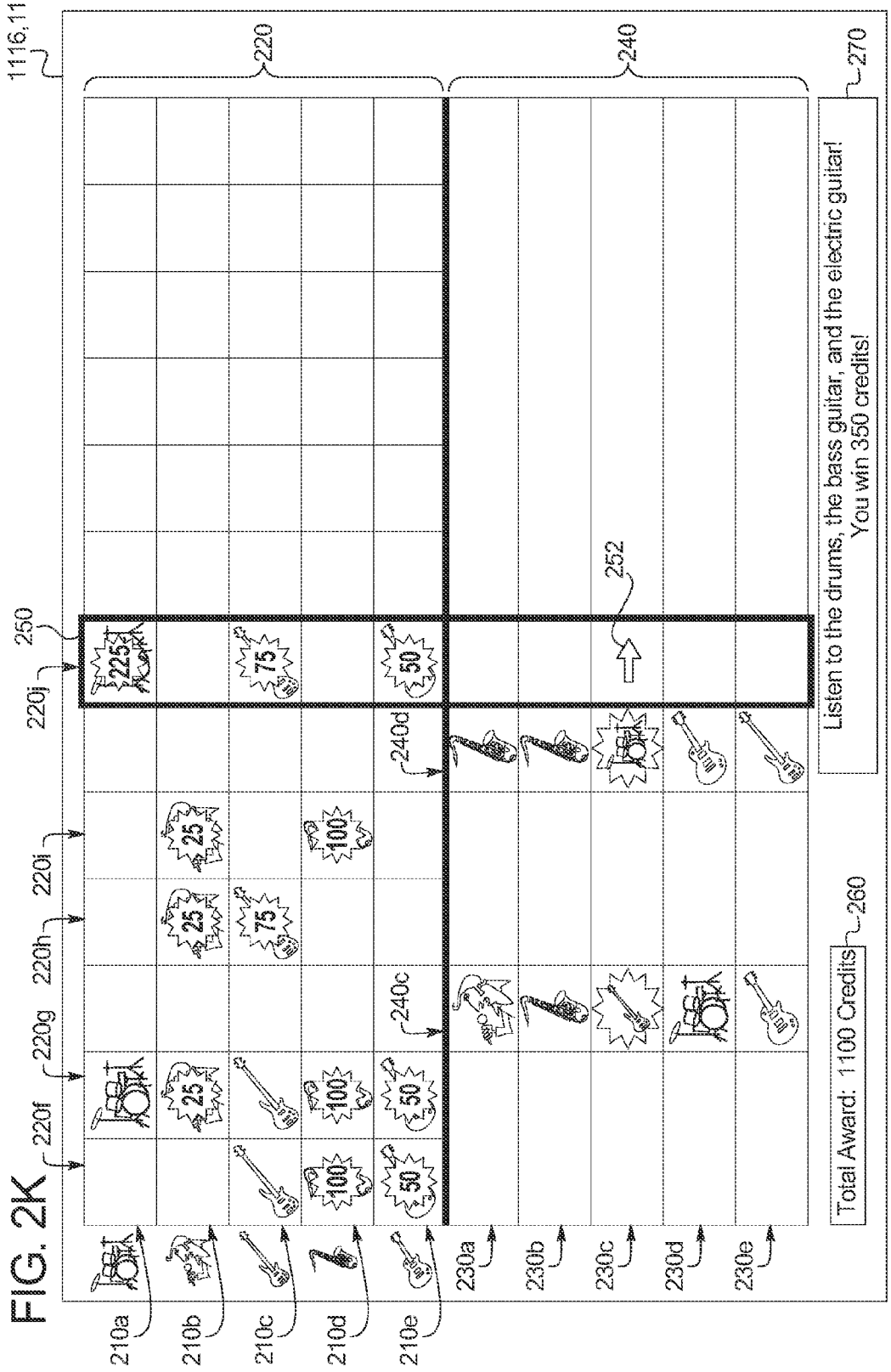

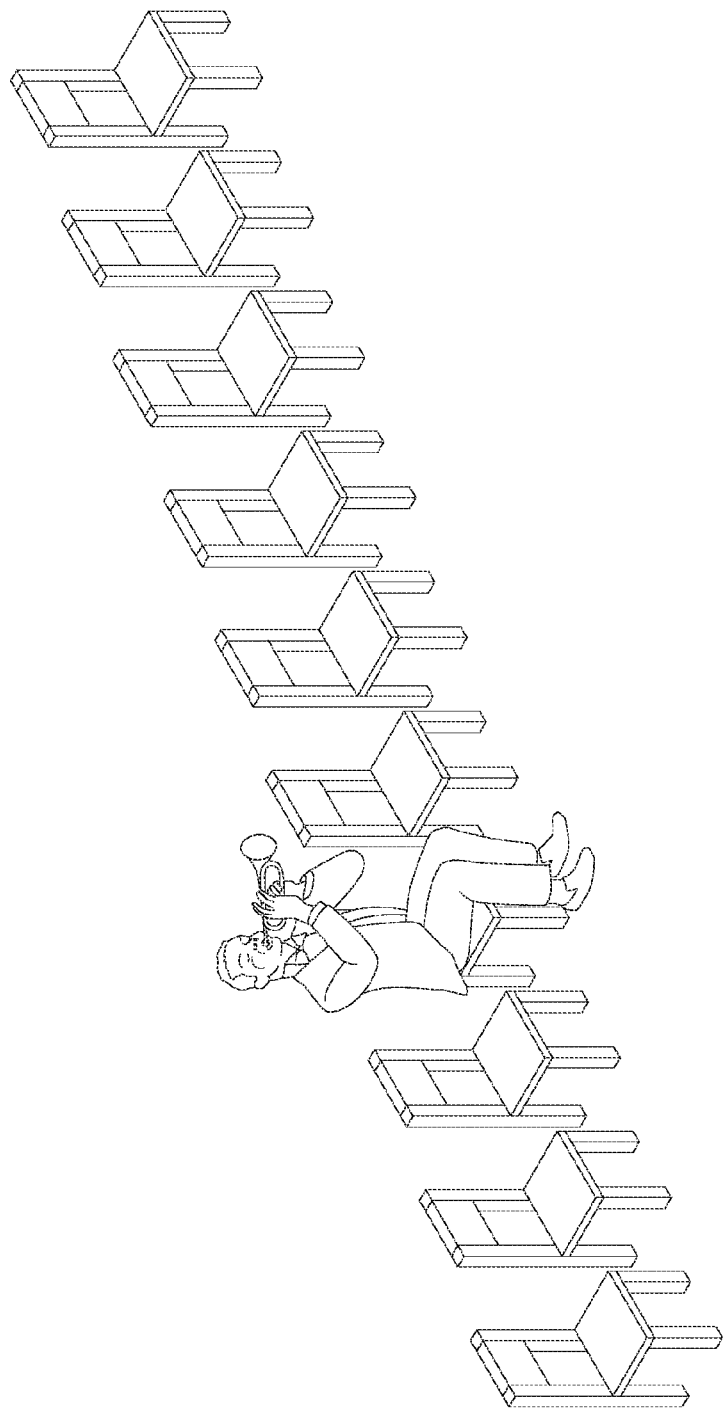

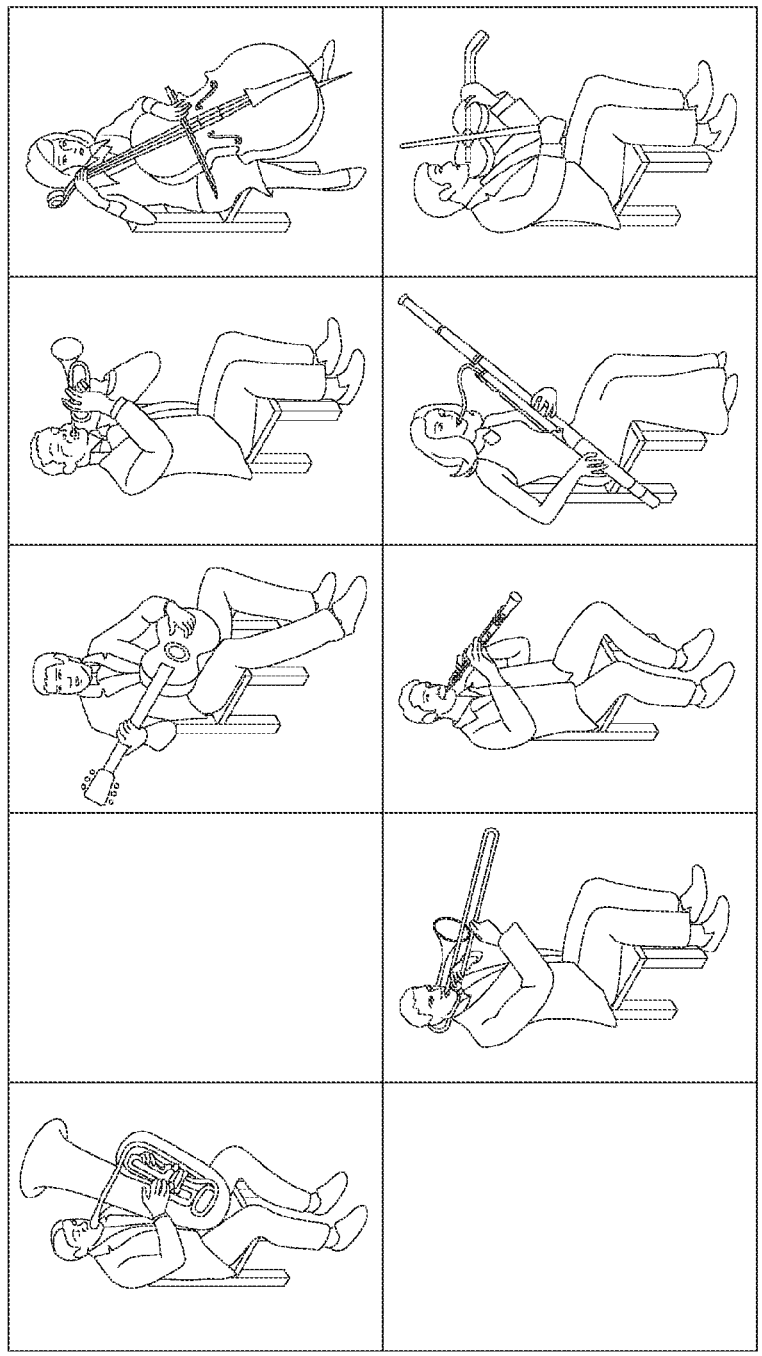

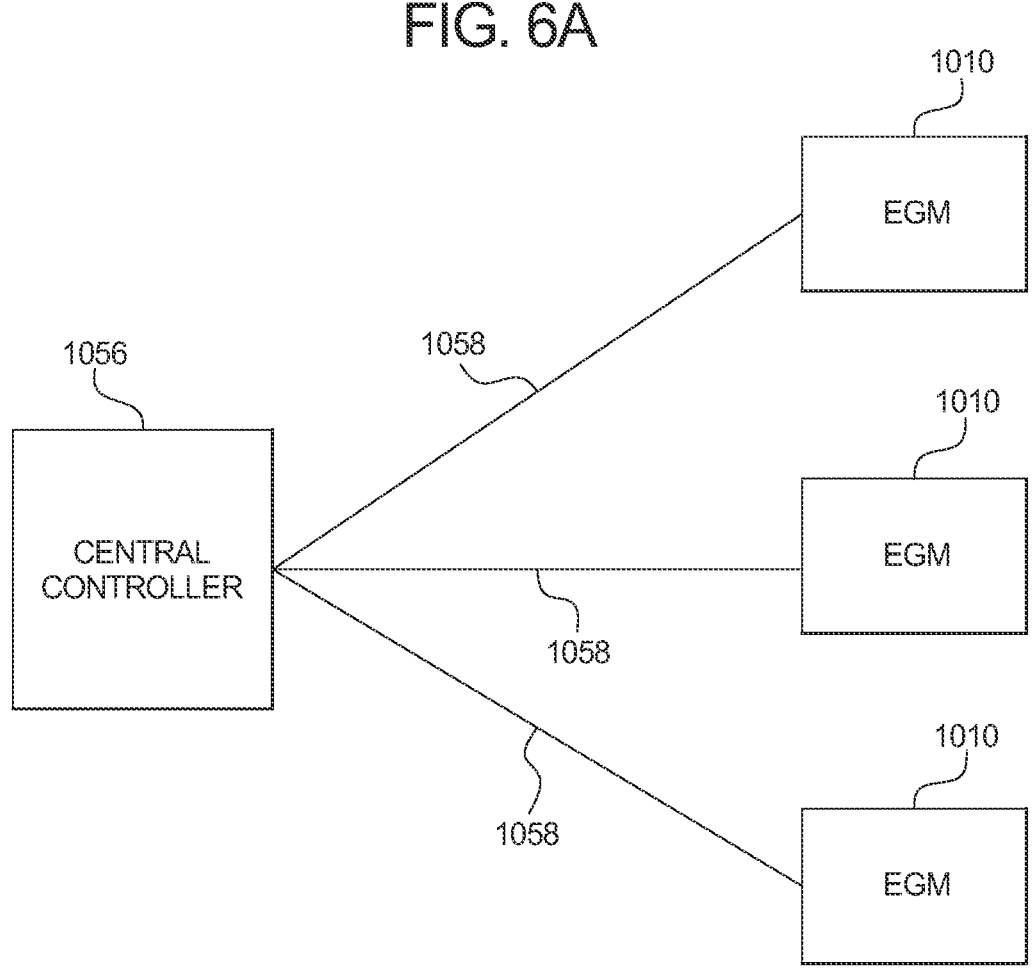

GAMING SYSTEM AND METHOD CONFIGURED TO PROVIDE A MUSICAL GAME ASSOCIATED WITH UNLOCKABLE MUSICAL INSTRUMENTS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent the or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable a player to wager a minimum quantity of credits, such as one credit (e.g., one penny, nickel, dime, quarter, or dollar), up to a maximum quantity of credits, such as five credits. The gaming machine may enable the player to place this wager a single time or multiple times for a single play of the primary game. For instance, a gaming machine configured to operate a slot game may have one or more paylines, and the gaming machine may enable a player to place a wager on each of the paylines for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming machines. Such gaming machines usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming machine may initiate or trigger a bonus game when a bonus symbol occurs on the payline on the third reel of a three reel slot machine. The gaming machine generally indicates when a bonus game is initiated or triggered through one or more visual and/or audio output devices, such as the reels, lights, speakers, display screens, etc. Part of the enjoyment and excitement of playing certain gaming machines is the initiation or triggering of a bonus game, even before the player knows an amount of a bonus award won via the bonus game.

There is a continuing need to provide new and exciting primary games and/or bonus or secondary games to increase player enjoyment and excitement.

SUMMARY

The present disclosure is directed to a gaming system and method configured to provide a musical game associated with unlockable musical instruments. In various embodiments, the gaming system provides a play of a musical game that is associated with at least one musical composition, such as a song, an instrumental, or any other suitable piece of music. The gaming system produces or outputs at least part of the musical composition for the play of the musical game by producing or outputting sounds associated with a plurality of different musical instruments at specific points in time. At the beginning of the play of the musical game, one or more of the musical instruments are unlocked (i.e., have an unlocked state) and one or more of the musical instruments are locked (i.e., have a locked state). During the play of the musical game, the gaming system produces the sounds associated with the unlocked musical instruments at the requisite points in time and provides an award associated with each unlocked musical instrument when the gaming system produces the sound(s) associated with that unlocked musical instrument. The gaming system does not, however, produce any sounds or provide any awards associated with the locked musical instruments.

At one or more points during the play of the musical game, the gaming system provides an instrument unlock event. When the instrument unlock event occurs, the gaming system determines whether to unlock one or more locked musical instruments. If the gaming system determines to unlock a locked musical instrument, the gaming system changes the state of that locked musical instrument from the locked state to the unlocked state (i.e., "unlocks" that musical instrument). Thereafter, when one of the instrument playing events associated with that (now unlocked) musical instrument occurs, the gaming system produces at least one sound associated with that musical instrument and provides the award associated with that musical instrument. It should thus be appreciated that the gaming system initially produces a version of the musical composition that employs fewer than all of the musical instruments associated with that musical composition, and enables locked musical instruments to be unlocked during the play of the musical game such that, as the play of the musical game proceeds and locked musical instruments are unlocked, the gaming system produces versions of the musical composition employing more and more of the musical instruments.

In one such embodiment, the musical game is associated with a plurality of different musical instruments. Initially, one or more of the musical instruments are unlocked and one or more of the musical instruments are locked. The musical game is also associated with a plurality of different instrument playing events, each of which is associated with one or more of the musical instruments. For a play of the musical game, the gaming system provides the instrument playing events in a designated order and at designated points in time. In this embodiment, upon an occurrence of one of the instrument playing events, for each unlocked musical instrument associated with that instrument playing event, the gaming system produces at least one sound associated with that musical instrument and provides an award associated with that musical instrument. For each locked musical instrument associated with that instrument playing event, the gaming system does not produce the at least one sound associated with that musical instrument and does not provide the award associated with that musical instrument.

In this embodiment, at one or more points during the play of the musical game, the gaming system provides an instrument unlock event. Upon an occurrence of the instrument unlock event, if any of the musical instruments are locked, the gaming system determines whether to unlock at least one locked musical instrument. If the gaming system determines to unlock at least one locked musical instrument, the gaming system changes the state of at least one locked musical instrument from the locked state to the unlocked state (i.e., "unlocks" that locked musical instrument). If, on the other hand, the gaming system determines not to unlock at least one locked musical instrument, the gaming system does not change the state of any of the locked musical instruments from the locked state to the unlocked state. In this embodiment, the play of the musical game ends when the gaming system has provided all of the instrument playing events.

Accordingly, in various embodiments, the gaming system of the present disclosure is configured to operate a musical game that associates individual awards with different sounds or pieces of music, thus creating a winning experience that is synchronized to music and enhancing player enjoyment, entertainment, and excitement.

Additional features and advantages are described herein, and will be apparent from, the following Detailed Description and the Figures.

BRIEF DESCRIPTION OF THE FIGURES

FIG. 1 is a flowchart illustrating an example method of operating the an embodiment of the gaming system of the present disclosure configured to operate an example musical game.

FIGS. 2A, 2B, 2C, 2D, 2E, 2F, 2G, 2H, 2I, 2J, and 2K illustrate screen shots of an embodiment of the gaming system of the present disclosure providing a play of an example musical game.

FIGS. 4A, 4B, and 4C illustrate screen shots of another embodiment of the gaming system of the present disclosure providing a play of another example of the musical game.

FIGS. 5A, 5B, and 5C illustrate screen shots of another embodiment of the gaming system of the present disclosure providing a play of another example of the musical game.

FIG. 6A is a schematic block diagram of one embodiment of a network configuration of the gaming system of the present disclosure.

DETAILED DESCRIPTION

Figure 2A:
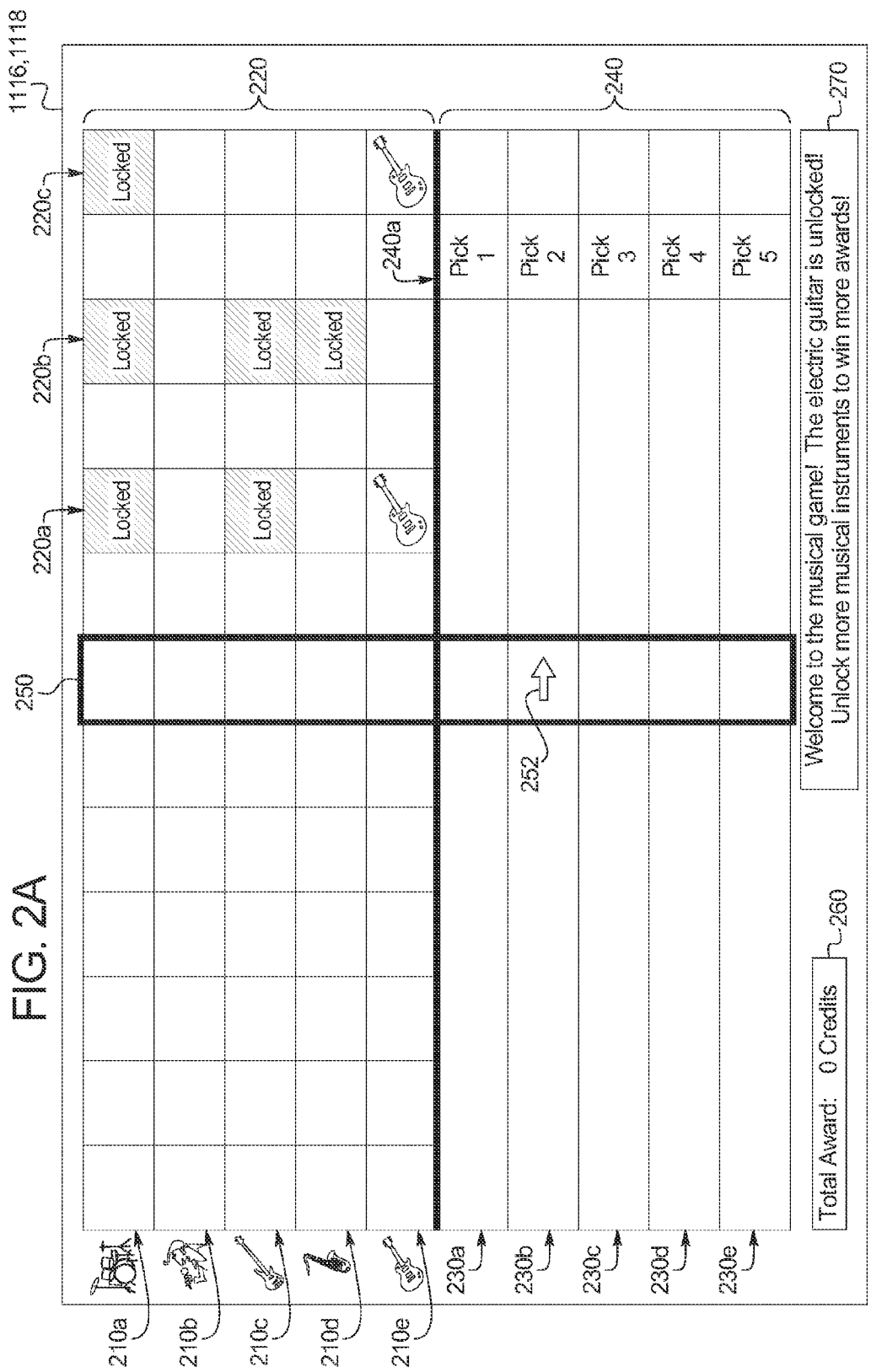

Musical Game Associated with Unlockable Musical Instruments

Various embodiments of the present disclosure provide gaming systems and methods configured to provide a musical game associated with unlockable musical instruments. While the musical game is a bonus or secondary game in certain of the embodiments described below, it should be appreciated that the musical game may be employed as or in association with a base or primary game. Moreover, while certain of the awards described below are amounts of monetary credits or currency, one or more of such awards may include non-monetary credits, promotional credits, and/or player tracking points or credits. Although not described below in the embodiments in which the selection game is a bonus game, it should be appreciated that the player's credit balance and any wagers placed by the player may also be provided in non-monetary credits, promotional credits, and/or player tracking points or credits.

FIG. 1 illustrates a flowchart of an example process or method 100 for operating an embodiment of the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a musical game that is associated with a plurality of different musical instruments. Each of the musical instruments is initially in one of an unlocked state and a locked state (i.e., is "unlocked" or "locked"). The musical game is also associated with a plurality of different instrument playing events, each of which is associated with one or more of the musical instruments. The gaming system initiates a play of the musical game, as indicated by block 102. The gaming system determines whether one of the instrument playing events occurs, as indicated by diamond 104. If the gaming system determines that one of the instrument playing events did not occur, process 100 proceeds to diamond 110, described below.

If, on the other hand, the gaming system determines that one of the instrument playing events occurred, for each of any unlocked musical instruments associated with that instrument playing event, the gaming system outputs (such as via a speaker, as described below) at least one sound associated with that musical instrument and provides an award associated with that musical instrument, as indicated by block 106. Additionally, for each of any locked musical instruments associated with that instrument playing event, the gaming system does not output the at least one sound associated with that musical instrument and does not provide the award associated with that musical instrument, as indicated by block 108. The gaming system determines whether an instrument unlock event occurred, as indicated by diamond 110. If the gaming system determines that an instrument unlock event did not occur, process 100 proceeds to diamond 116, described below.

If, on the other hand, the gaming system determines that an instrument unlock event occurred, the gaming system determines whether at least one of the locked musical instruments should be unlocked, as indicated by diamond 112. If the gaming system determines that none of the locked musical instruments should be unlocked, process 100 proceeds to diamond 116, described below. If the gaming system instead determines that at least one of the locked musical instruments should be unlocked, the gaming system changes the state of at least one of the locked musical instruments from the locked state to the unlocked state, as indicated by block 114.

The gaming system determines whether any of the instrument playing events remain (i.e., whether any of the instrument playing events have not yet occurred), as indicated by diamond 116. If any of the instrument playing events remain, process 100 returns to block 104. If none of the instrument playing events remain, the gaming system ends the play of the musical game, as indicated by block 118.

FIGS. 2A, 2B, 2C, 2O, 2E, 2F, 2G, 2H, 2I, 2J, and 2K illustrate screen shots of an example embodiment of the gaming system of the present disclosure. In this example, the gaming system is configured to operate a primary wagering game (not shown) and the musical game as a bonus game. The gaming system initiates a play of the musical game upon an occurrence of a triggering event associated with the primary wagering game. For instance, when the primary wagering game is a slot game, the gaming system initiates a play of the musical game when a designated symbol combination results from a spin of the reels of the slot game. It should be appreciated that the primary wagering game may be any suitable game (such as any of those described below with respect to FIGS. 6A, 6B, 7A, and 7B), and that the triggering event may be any suitable event.

In this example, the musical game is associated with the following five musical instruments: the drums, the vocals, the bass guitar, the saxophone, and the electric guitar. Each of the musical instruments is associated with an award. In this example, the drums are associated with an award of 225 credits, the vocals are associated with an award of 25 credits, the bass guitar is associated with an award of 75 credits, the saxophone is associated with an award of 100 credits, and the electric guitar is associated with an award of 50 credits.

It should be appreciated that the musical game may be associated with any suitable quantity of instruments. It should also be appreciated that the instruments associated with the musical game may be any suitable instruments or groups of instruments, such as (but not limited to): the piano, the keyboard, the organ, the acoustic guitar, the electric guitar, the bass guitar, the banjo, the flute, the piccolo, the clarinet, the oboe, the violin, the viola, the cello, the trumpet, the French horn, the trombone, the tuba, the bagpipes, the harp, the accordion, the bongo drums, the mandolin, bells, the xylophone, turntable scratching, sound effects (such as car horns or animal noises), wind instruments, stringed instruments, electronic instruments, keyboard instruments, percussion instruments, membranophones, sopranos, mezzo-sopranos, altos, contraltos, countertenors, tenors, baritones, and/or basses. It should further be appreciated that each instrument may be associated with any suitable type of award, and that such award may be of any suitable amount. In one embodiment, physically larger instruments are associated with larger awards than physically smaller instruments. In another embodiment, louder instruments are associated with larger awards than quieter instruments. In a further embodiment, each instrument of a designated group of instruments is associated with a same award. For example, all wind instruments are associated with an award of 50 credits and all stringed instruments are associated with an award of 100 credits.

At least one of the musical instruments is initially unlocked (i.e., is in an "unlocked" state) and at least one of the musical instruments is in initially locked (i.e., in a "locked" state). In this example, the electric guitar is initially unlocked and the drums, the vocals, the bass guitar, and the saxophone are initially locked. It should be appreciated that, in various embodiments, the initial unlocked or locked state of each of the musical instruments is: predetermined, randomly determined, determined based on weighted probabilities, determined based on a wager, determined based on a player tracking status of the player, determined based on player choice, determine based on a progressive in which more instruments are initially unlocked as more wagers are placed, determined based on bonus trigger symbols (a bonus trigger symbol that triggers the play of the musical game may designate which instruments) is initially unlocked), at least partially randomly determined such that the combination of initially unlocked and locked instruments is different than the combination of initially unlocked and locked instruments for an immediately preceding play of the musical game, determined based on which musical composition is chosen by the player, or determined in any other suitable manner or based on any other suitable factor or factors. It should also be appreciated that the initial quantities of unlocked and locked musical instruments may be determined in any suitable manner or based on any suitable factor or factors (such as any of those described above).

The musical game is associated with a plurality of different instrument playing events, each of which is associated with one or more of the musical instruments. For the play of the musical game, the gaming system provides the instrument playing events in a designated order and at designated points in time. In this example, by providing the instrument playing events in the designated order at the designated points in time, the gaming system provides a musical composition, such as a song, an instrumental, or any other suitable piece of music. Thus, in this embodiment, the gaming system provides the musical game for the duration of the musical composition.

It should be appreciated that the gaming system may determine the musical composition to employ for the play of the musical game in any suitable manner. In one embodiment, the musical game is associated with a predetermined musical composition or selects the musical composition to employ based on a predetermined order. In another embodiment, the gaming system randomly selects one of a plurality of musical compositions, and employs the selected musical composition for the play of the musical game. In a further embodiment, the gaming system determines one of a plurality of musical compositions to employ for the play of the musical game based on the outcome of the primary game. In another embodiment, the gaming system is associated with a plurality of different triggering events, each of which is associated with a different one of a plurality of musical compositions. In this embodiment, when one of the triggering events occurs, the gaming system initiates a play of the musical game employing the musical composition associated with that triggering event. In a further embodiment, the gaming system enables the player to select one of a plurality of musical compositions, and employs the selected musical composition for the play off the musical game. In one such embodiment, the gaming system provides the player more musical compositions from which to choose if the player successfully unlocks all of the locked musical instruments of a previously or currently employed musical composition. In a further embodiment, the gaming system determines the musical composition based in part on external factors, such as the time of year (e.g., determines a Christmas song in December) or to coincide with new movie launches (e.g., determines a particular theme song associated with a new movie).

In various embodiments, the gaming system provides a plurality of musical compositions for a single play of the musical game. For instance, the gaming system provides two complete songs for a single play of the musical game. In other embodiments, the gaming system provides for a portion of a musical composition for a play of the musical game. For example, the gaming system provides one minute of a five minute long instrumental for a play of the musical game.

In one embodiment, at least two of the musical compositions have the same average expected payback percentage and the same volatility. In another embodiment, at least two of the musical compositions have the same average expected payback percentage and different volatilities. In another embodiment, at least two of the musical compositions have different average expected payback percentages and the same volatility. In a further embodiment, at least two of the musical compositions have different average expected payback percentages and different volatilities. In one embodiment, at least two of the musical compositions are associated with the same musical instruments, while in another embodiment at least two of the musical compositions are associated with different musical instruments.

In this example, upon an occurrence of one of the instrument playing events, for each unlocked musical instrument associated with that instrument playing event, the gaming system produces or outputs at least one sound associated with that musical instrument and provides the award associated with that musical instrument. For each locked musical instrument associated with that instrument playing event, the gaming system does not produce the at least one sound associated with that musical instrument and does not provide the award associated with that musical instrument. For instance, if an instrument playing event that is associated with the locked drums, the locked bass guitar, and the unlocked electric guitar occurs, the gaming system produces the at least one sound associated with and provides the award associated with the electric guitar because the electric guitar is unlocked, but does not produce the at least one sound associated with or provide the award associated with either of the drums or the bass guitar because the drums and the bass guitar are locked.

The present disclosure contemplates displaying representations of the instrument playing events and the occurrences of such events. FIG. 2A illustrates a screen shot of this example gaming system upon initiation of a play of the musical game. The gaming system displays (such as on a display device 1116 or 1118, as described below) a music area 220, which displays (at various points in time) representations of the instrument playing events and the occurrences of those instrument playing events. Music area 220 includes five instrument rows 210a, 210b, 210c, 210d, and 210e, each of which is associated with a different one of the instruments. In this example, instrument row 210a is associated with the drums, instrument row 210b is associated with the vocals, instrument row 210c is associated with the bass guitar, instrument row 210d is associated with the saxophone, and instrument row 210e is associated with the electric guitar. The gaming system also displays a vertical sound bar 250 spanning music area 220.

Each instrument playing event is represented in music area 220 by an instrument group including indications for the musical instruments associated with that instrument playing event. More specifically, for a given instrument playing event, the gaming system displays, at a designated horizontal position within music area 220, an instrument group including an indication for each musical instrument associated with that instrument playing event at the instrument row associated with that musical instrument. In this example, if that musical instrument is unlocked, the gaming system displays an indication of that musical instrument, and if that musical instrument is locked, the gaming system displays a "LOCKED" indication.

For instance, as shown in FIG. 2A, the gaming system displays instrument group 220a at a designated horizontal position within music area 220. Instrument group 220a represents an instrument playing event associated with the drums, the bass guitar, and the electric guitar. Accordingly, instrument group 220a includes an indication in instrument row 210a (which is associated with the drums), instrument row 210c (which is associated with the bass guitar), and instrument row 210e (which is associated with the electric guitar). Since the drums and the bass guitar are locked at this point, instrument group 220a includes a "LOCKED" indication in instrument rows 210a and 210c, which are associated with the drums and the bass guitar. Since the electric guitar is unlocked at this point, instrument group 220a includes an indication of the electric guitar in instrument row 210e (which is associated with the electric guitar).

In operation, during the play of the musical game the gaming system displays the instrument groups moving from right to left (or left to right, or top to bottom, or bottom to top, or in any other suitable direction) at a predetermined rate while keeping sound bar 250 stationary such that the instrument groups pass through and are indicated by sound bar 250. When an instrument group passes through and is indicated by sound bar 250, the instrument playing event represented by that indicated instrument group occurs, and the gaming system produces the at least one sound associated with any unlocked musical instruments associated with that instrument playing event and provides any awards associated with those unlocked musical instruments. The gaming system does not produce any sounds associated with or provide any awards associated with any locked musical instruments associated with that instrument playing event. It should be appreciated that the designated horizontal position at which each instrument group is located is determined based on the designated point in time at which the instrument playing event represented by that instrument group is to occur and the rate at which the instrument groups move from right to left.

In this example, at a plurality of points during the play of the musical game, the gaming system provides an instrument unlock event. Upon an occurrence of the instrument unlock event, if any of the musical instruments are locked, the gaming system determines whether to unlock at least one locked musical instrument. If the gaming system determines to unlock at least one locked musical instrument, the gaming system changes the state of at least one locked musical instrument from the locked state to the unlocked state (i.e., "unlocks" that locked musical instrument). If, on the other hand, the gaming system determines not to unlock at least one locked musical instrument, the gaming system does not change the state of any of the locked musical instruments from the locked state to the unlocked state. It should be appreciated that, in other embodiments, the gaming system always unlocks at least one locked musical instrument upon an occurrence of an instrument unlock event. That is, in such embodiments, the gaming system does not conduct a determination of whether to unlock any locked musical instruments following the occurrence of the instrument unlock event.

The present disclosure contemplates displaying representations of the instrument unlock events and the occurrences of such events. As shown in FIG. 2A, the gaming system displays a selection area 240, which displays (at various points in time) representations of the instrument unlock events and the occurrences of those instrument unlock events. Selection area 240 includes five selection rows 230a, 230b, 230c, 230d, and 230e. The gaming system also displays sound bar 250 spanning selection area 240.

Each instrument unlock event is represented in selection area 240 by a selection group including a column of indications of selections. Each of the selections is associated with one of the musical instruments. More specifically, for each instrument unlock event in this example, the gaming system displays, at a designated horizontal position within selection area 240, a selection group including an indication of a selection in each of selection rows 230a, 230b, 230c, 230d, and 230e. In this example, the displayed indication of each selection does not indicate the musical instrument with which that selection is associated. The gaming system also displays a selector 252 within sound bar 250 and in one of selection rows 230a, 230b, 230c, 230d, and 230e. The selector is configured to pick one of the selections upon the occurrence of the instrument unlock event. For instance, as shown in FIG. 2A, the gaming system displays selection group 240a, which includes an indication of a selection in each of selection rows 230a, 230b, 230c, 230d, and 230e. The gaming system also displays selector 252 in selection row 230b within sound bar 250.

In operation, during the play of the musical game the gaming system displays the selection groups moving from right to left at the same predetermined rate as the instrument groups while keeping sound bar 250 stationary such that the selection groups pass through and are indicated by sound bar 250. In this example, the gaming system enables a player to choose in which selection row to position selector 252. When a selection group passes through and is indicated by sound bar 250, the instrument unlock event represented by that indicated selection group occurs. Upon the occurrence of that instrument unlock event, the gaming system reveals the musical instruments associated with the selections. The gaming system determines whether the musical instrument associated with the selection in the selection row at which selector 252 is positioned (i.e., the picked selection) is locked or unlocked. If the musical instrument associated with the picked selection is locked, the gaming system unlocks that musical instrument. If not, the gaming system does not unlock any locked musical instruments. In another embodiment, if the musical instrument associated with the picked selection is already unlocked, the gaming system provides a multiplier, and employs that multiplier for the play of the musical game.

FIGS. 2A, 2B, 2C, 2D, 2E, 2F, 2G, 2H, 2I, 2J, and 2K illustrate screen shots of an embodiment of the gaming system of the present disclosure operating an example play of such a musical game. As shown in FIG. 2A, upon initiation of the play of the musical game at a first point in time, the gaming system displays instrument groups 220a, 220b, and 220c at designated horizontal positions within music area 220. Instrument group 220a is associated with the drums, the bass guitar, and the electric guitar. Since, at this point, the electric guitar is unlocked and the drums and the bass guitar are locked, instrument group 220a includes an indication the electric guitar in instrument row 210e (which is associated with the electric guitar) and a "LOCKED" indication in instrument row 210a (which is associated with the drums) and instrument row 210c (which is associated with the bass guitar). Instrument group 220b is associated with the drums, the bass guitar, and the saxophone. Since, at this point, the drums, the bass guitar, and the saxophone are locked, instrument group 220b includes an indication of "LOCKED" in instrument row 210a (which is associated with the drums), instrument row 210c (which is associated with the bass guitar), and instrument row 210d (which is associated with the saxophone). Instrument group 220c is associated with the drums and the electric guitar. Since, at this point, the electric guitar is unlocked and the drums are locked, instrument group 220c includes an indication of the electric guitar in instrument 210e (which is associated with the electric guitar) and a "LOCKED" indication in instrument row 210a (which is associated with the drums).

The gaming system also displays selection group 240a at a designated horizontal position within selection area 240. Selection group 240a includes an indication of a different available selection in each selection row. As described above, the gaming system displays a sound bar 250 spanning music area 220 and selection area 240, and a selector 252 positioned in one of the selection rows within sound bar 250. Initially, selector 252 is displayed in selection row 230b, but the gaming system enables the player to re-position selector 252 by making an input.

The gaming system also displays an award meter 260 that displays the total award for the play of the musical game. While in this illustrated example the gaming system indicates any awards provided to the player in the form of amounts of credits, it should be appreciated that such indications may alternatively or additionally be made in the form of amounts of currency. Additionally, the gaming system displays a message display area 270, which displays information, notifications, and/or messages before, during, or after play of the musical game.

The gaming system begins displaying the instrument groups and the selection group moving from right to left at a predetermined rate while keeping sound bar 250 and selector 252 stationary. The gaming system displays the following message in message display area 270: "WELCOME TO THE MUSICAL GAME! THE ELECTRIC GUITAR IS UNLOCKED. UNLOCK MORE MUSICAL INSTRUMENTS TO WIN MORE AWARDS!"

FIG. 2B illustrates the play of the musical game at a second subsequent point in time after the instrument groups and the selection group have moved from right to left. The gaming system now displays instrument group 220d, which is associated with the vocals and the electric guitar, at a designated horizontal position within music area 220. Since, at this point, the electric guitar is unlocked and the vocals are locked, instrument group 220d includes an indication of the electric guitar in instrument row 210e (which is associated with the electric guitar) and a "LOCKED" indication in instrument row 210b (which is associated with the vocals). The gaming system displays the following message in message display area 270: "LISTEN FOR THE MUSIC!"

FIG. 2C illustrates the play of the musical game at a third subsequent point in time after the instrument groups and the selection group have moved from right to left. The gaming system now displays selection group 240b at a designated horizontal position within selection area 240. Selection group 240b includes an indication of a different available selection in each selection row. At this point in time, sound bar 250 indicates instrument group 220a. Therefore, the instrument playing event associated with instrument group 220a, which is associated with the unlocked electric guitar, the locked drums, and the locked bass guitar, occurs. The gaming system produces the at least one sound associated with the unlocked electric guitar, provides the 50 credit award associated with the electric guitar, and displays an indication of the 50 credit award in association with the displayed indication of the electric guitar. The gaming system updates the quantity of credits displayed in award meter 260 to 50 credits to reflect this award. Since the drums and the bass guitar are locked, the gaming system does not produce the at least one sound associated with those musical instruments or provide the awards associated with those musical instruments. The gaming system displays the following message in message display area 270: "LISTEN TO THE ELECTRIC GUITAR! YOU WIN 50 CREDITS!"

FIG. 2D illustrates the play of the musical game at a fourth subsequent point in time after the instrument groups and the selection groups have moved from right to left. The gaming system now displays instrument group 220e, which is associated with the vocals, at a designated horizontal position within music area 220. Since, at this point, the vocals are locked, instrument group 220e includes a "LOCKED" indication in instrument row 220b (which is associated with the vocals). The gaming system receives an input from the player to re-position selector 252 from selection row 230b to selection row 230d and, accordingly, the gaming system repositions selector 252 to selection row 230d. The gaming system displays the following message in message display area 270: "LISTEN FOR THE MUSIC!"

FIG. 2E illustrates the play of the musical game at a fifth subsequent point in time after the instrument groups and the selection groups have moved from right to left. The gaming system now displays instrument group 220f, which is associated with the bass guitar, the saxophone, and the electric guitar, at a designated horizontal position within music area 220. Since, at this point, the electric guitar is unlocked and the bass guitar and the saxophone are locked, instrument group 220f includes an indication of the electric guitar in instrument row 210e (which is associated with the electric guitar) and a "LOCKED" indication in instrument row 210c (which is associated with the bass guitar) and instrument row 210d (which is associated with the saxophone). At this point in time, sound bar 250 indicates instrument group 220b. Therefore, the instrument playing event associated with instrument group 220b, which is associated with the locked drums, the locked bass guitar, and the locked saxophone, occurs. Since the drums, the bass guitar, and the saxophone are locked, the gaming system does not produce the at least one sound associated with those musical instruments or provide the awards associated with those musical instruments. The gaming system displays the following message in message display area 270: "SORRY, NONE OF THESE MUSICAL INSTRUMENTS ARE UNLOCKED."

FIG. 2F illustrates the play of the musical game at a sixth subsequent point in time after the instrument groups and the selection groups have moved from right to left. The gaming system now displays instrument group 220g, which is associated with the drums, the vocals, the bass guitar, the saxophone, and the electric guitar, at a designated horizontal position within music area 220. Since, at this point, the electric guitar and the vocals (explained below) are unlocked and the drums, the bass guitar, and the saxophone are locked, instrument group 220g includes an indication of the electric guitar in instrument row 210e (which is associated with the electric guitar), an indication of the vocals in instrument row 210b, and a "LOCKED" indication in instrument row 210a (which is associated with the drums), instrument row 210c (which is associated with the bass guitar), and instrument row 210d (which is associated with the saxophone).

At this point in time, sound bar 250 indicates selection group 240a. Therefore, the instrument unlock event associated with selection group 240a occurs. Upon the occurrence of that instrument unlock event, the gaming system reveals that: the selection displayed in selection row 230a is associated with the vocals, the selection displayed in selection row 230b is associated with the drums, the selection displayed in selection row 230c is associated with the electric guitar, the selection displayed in selection row 230d is associated with the vocals, and the selection displayed in selection row 230e is associated with the bass guitar. The gaming system determines that the musical instrument associated with the picked selection, which are the vocals associated with the selection displayed in selection row 230d, is locked. Since the vocals are locked, the gaming system unlocks the vocals. When doing so, the gaming system changes any "LOCKED" indications displayed in instrument row 210b (shown in the preceding Figures) to indications of the vocals. Thus, the gaming system changes the "LOCKED" indications displayed in instrument row 210b of instrument groups 220d, 220e, and 220g to indications of the vocals. The gaming system displays the following message in message display area 270: "YOU UNLOCKED THE VOCALS!"

FIG. 2G illustrates the play of the musical game at a seventh subsequent point in time after the instrument groups and the selection groups have moved from right to left. Between the sixth point in time (illustrated in FIG. 2F) and the seventh point in time, the instrument playing events associated with instrument groups 220c and 220d occurred, and the gaming system provided awards of 50 credits and 75 credits, respectively, for the occurrences of those instrument playing events. The gaming system updated the quantity of credits displayed in award meter 260 to 175 credits to reflect these awards.

The gaming system now displays instrument groups 220h and 220i at designated horizontal positions within music area 220. Instrument group 220h is associated with the vocals and the bass guitar. Since, at this point, the vocals are unlocked and the bass guitar is locked, instrument group 220h includes an indication the vocals in instrument row 210b (which is associated with the vocals) and a "LOCKED" indication in instrument row 210c (which is associated with the bass guitar). Instrument group 220i is associated with the vocals and the saxophone. Since, at this point, the vocals and the saxophone (explained below) are unlocked, instrument group 220i includes an indication of the vocals in instrument row 210b (which is associated with the vocals) and an indication of the saxophone in instrument row 210d (which is associated with the saxophone).

The gaming system also displays selection group 240c at a designated horizontal position within selection area 240. Selection group 240c includes an indication of a different available selection in each selection row. At this point in time, sound bar 250 indicates selection group 240b. Therefore, the instrument unlock event associated with selection group 240b occurs. Upon the occurrence of that instrument unlock event, the gaming system reveals that: the selection displayed in selection row 230a is associated with the bass guitar, the selection displayed in selection row 230b is associated with the vocals, the selection displayed in selection row 230c is associated with the drums, the selection displayed in selection row 230d is associated with the saxophone, and the selection displayed in selection row 230e is associated with the electric guitar. The gaming system determines that the musical instrument associated with the picked selection, which is the saxophone associated with the selection displayed in selection row 230d, is locked. Since the saxophone is locked, the gaming system unlocks the saxophone. When doing so, the gaming system changes any "LOCKED" indications displayed in instrument row 210d (shown in the preceding Figures) to indications of the saxophone. Thus, the gaming system changes the "LOCKED" indications displayed in instrument row 210b of instrument groups 220b, 220f, 220g, and 220i to indications of the saxophone. The gaming system displays the following message in message display area 270: "YOU UNLOCKED THE SAXOPHONE!"

FIG. 2H illustrates the play of the musical game at an eighth subsequent point in time after the instrument groups and the selection groups have moved from right to left. Between the seventh point in time (illustrated in FIG. 2G) and the eighth point in time, the instrument playing events associated with instrument groups 220e and 220f occurred, and the gaming system provided awards of 25 credits and 150 credits, respectively, for the occurrences of those instrument playing events. The gaming system updated the quantity of credits displayed in award meter 260 to 350 credits to reflect these awards.

The gaming system now displays instrument group 220j at a designated horizontal position within music area 220. Instrument group 220j is associated with the drums, the bass guitar, and the electric guitar. Since, at this point, the electric guitar is unlocked and the drums and the bass guitar are locked, instrument group 220j includes an indication of the electric guitar in instrument row 210e (which is associated with the electric guitar) and a "LOCKED" indication in instrument row 210a (which is associated with the drums) and instrument row 210c (which is associated with the bass guitar). The gaming system also displays selection group 240d at a designated horizontal position within selection area 240. Selection group 240d includes an indication of a different available selection in each selection row.

At this point in time, sound bar 250 indicates instrument group 220g. Therefore, the instrument playing event associated with instrument group 220g, which is associated with the locked drums, the unlocked vocals, the locked bass guitar, the unlocked saxophone, and the unlocked electric guitar, occurs. The gaming system produces the at least one sound associated with the unlocked vocals, provides an award of 25 credits associated with the vocals, and displays an indication of the 25 credit award in association with the displayed indication of the vocals; produces the at least one sound associated with the unlocked saxophone, provides the award of 100 credits associated with the saxophone, and displays an indication of the 100 credit award in association with the displayed indication of the saxophone; and produces the at least one sound associated with the unlocked electric guitar, provides the award of 50 credits associated with the electric guitar, and displays an indication of the 50 credit award in association with the displayed indication of the electric guitar. The gaming system updates the quantity of credits displayed in award meter 260 to 525 credits to reflect these awards. Since the drums and the bass guitar are locked, the gaming system does not produce the at least one sound associated with those musical instrument or provide the awards associated with those musical instruments. The gaming system receives an input from the player to re-position selector 252 from selection row 230d to selection row 230c and, accordingly, the gaming system repositions selector 252 to selection row 230c. The gaming system displays the following message in message display area 270: "LISTEN TO THE VOCALS, THE SAXOPHONE, AND THE ELECTRIC GUITAR! YOU WIN 175 CREDITS!"

FIG. 2I illustrates the play of the musical game at a ninth subsequent point in time after the instrument groups and the selection groups have moved from right to left. At this point in time, sound bar 250 indicates selection group 240c. Therefore, the instrument unlock event associated with selection group 240c occurs. Upon the occurrence of that instrument unlock event, the gaming system reveals that: the selection displayed in selection row 230a is associated with the vocals, the selection displayed in selection row 230b is associated with the saxophone, the selection displayed in selection row 230c is associated with the bass guitar, the selection displayed in selection row 230d is associated with the drums, and the selection displayed in selection row 230e is associated with the electric guitar. The gaming system determines that the musical instrument associated with the picked selection, which is the bass guitar associated with the selection displayed in selection row 230c, is locked. Since the bass guitar is locked, the gaming system unlocks the bass guitar. When doing so, the gaming system changes any "LOCKED" indications displayed in instrument row 210c (as shown in the preceding Figures) to indications of the bass guitar. Thus, the gaming system changes the "LOCKED" indications displayed in instrument row 210c of instrument groups 220f, 220g, 220h, and 220j to indications of the bass guitar. The gaming system displays the following message in message display area 270: "YOU UNLOCKED THE BASS GUITAR!"

FIG. 2J illustrates the play of the musical game at a tenth subsequent point in time after the instrument groups and the selection groups have moved from right to left. Between the ninth point in time (illustrated in FIG. 2I) and the tenth point in time, the instrument playing events associated with instrument groups 220h and 220i occurred, and the gaming system provided awards of 100 credits and 125 credits, respectively, for the occurrences of those instrument playing events. The gaming system updated the quantity of credits displayed in award meter 260 to 750 credits to reflect these awards.

At this point in time, sound bar 250 indicates selection group 240d. Therefore, the instrument unlock event associated with selection group 240d occurs. Upon the occurrence of that instrument unlock event, the gaming system reveals that: the selection displayed in selection row 230a is associated with the saxophone, the selection displayed in selection row 230b is associated with the saxophone, the selection displayed in selection row 230c is associated with the drums, the selection displayed in selection row 230d is associated with the electric guitar, and the selection displayed in selection row 230e is associated with the bass guitar. The gaming system determines that the musical instrument associated with the selected selection, which are the drums associated with the selection displayed in selection row 230c, is locked. Since the drums are locked, the gaming system unlocks the drums. When doing so, the gaming system changes any "LOCKED" indications displayed in instrument row 210a (as shown in the preceding Figures) to indications of the drums. Thus, the gaming system changes the "LOCKED" indications displayed in instrument row 210a of instrument groups 220g and 220j to indications of the drums. The gaming system displays the following message in message display area 270: "YOU UNLOCKED THE DRUMS!"

FIG. 2K illustrates the play of the musical game at an eleventh subsequent point in time after the instrument groups and the selection group have moved from right to left. At this point in time, sound bar 250 indicates instrument group 220j. Therefore, the instrument playing event associated with instrument group 220j, which is associated with the unlocked drums, the unlocked bass guitar, and the unlocked electric guitar, occurs. The gaming system: produces the at least one sound associated with the unlocked drums, provides an award of 225 credits associated with the drums, and displays an indication of the 225 credit award in association with the displayed indication of the drums; produces the at least one sound associated with the unlocked bass guitar, provides the award of 75 credits associated with the bass guitar, and displays an indication of the 75 credit award in association with the displayed indication of the bass guitar; and produces the at least one sound associated with the unlocked electric guitar, provides the award of 50 credits associated with the electric guitar, and displays an indication of the 50 credit award in association with the displayed indication of the electric guitar. The gaming system updates the quantity of credits displayed in award meter 260 to 1100 credits to reflect these awards. The gaming system displays the following message in message display area 270: "LISTEN TO THE DRUMS, THE BASS GUITAR, AND THE ELECTRIC GUITAR! YOU WIN 350 CREDITS!"

At this point, the play of the musical game ends because all of the instrument playing events have occurred (i.e., because the musical composition has ended).

Figure 3A:
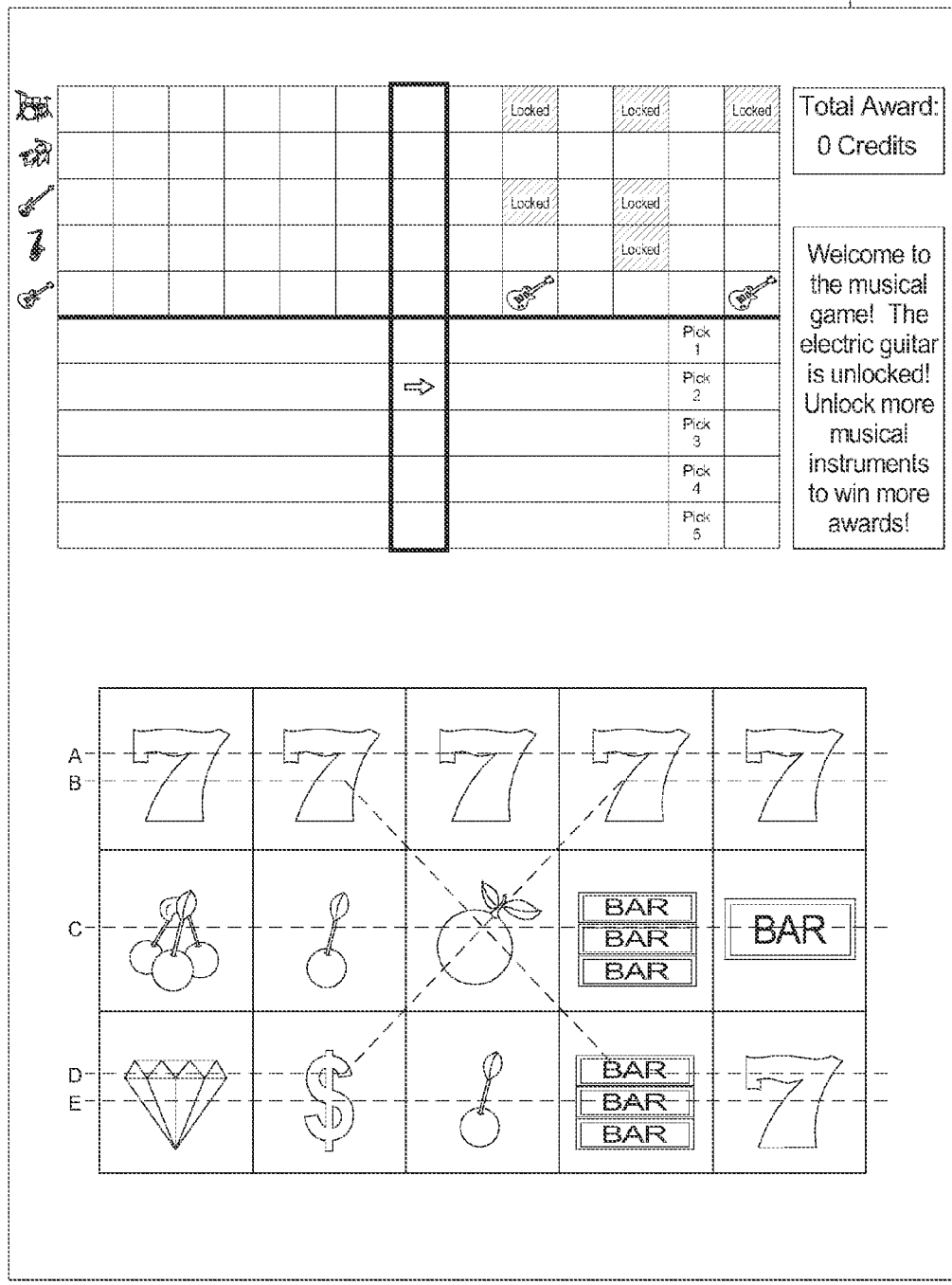
FIG. 3A illustrates a screen shot of another embodiment of the gaming system of the present disclosure providing a play of another example of the musical game in association with play of a slot game.

It should be appreciated that the example embodiment of the musical game described above with respect to FIGS. 2A to 2K is one example manner in which the gaming system may display the musical game, and that the gaming system may display the musical game in any suitable manner. In another embodiment, such as that shown in FIG. 3A, the gaming system displays the musical game above the primary game. In another embodiment, such as that shown in FIG. 3B, the gaming system displays the musical game to the side of the primary game. In another embodiment, such as that shown in FIG. 7B, the gaming system displays the primary game using a primary display device and the musical game using a secondary display device.

It should also be appreciated that, in certain embodiments, the gaming system does not display the musical game. That is, in these embodiments, the musical game is performed "behind the scenes" and is not visually presented to the player.

Figure 4B:
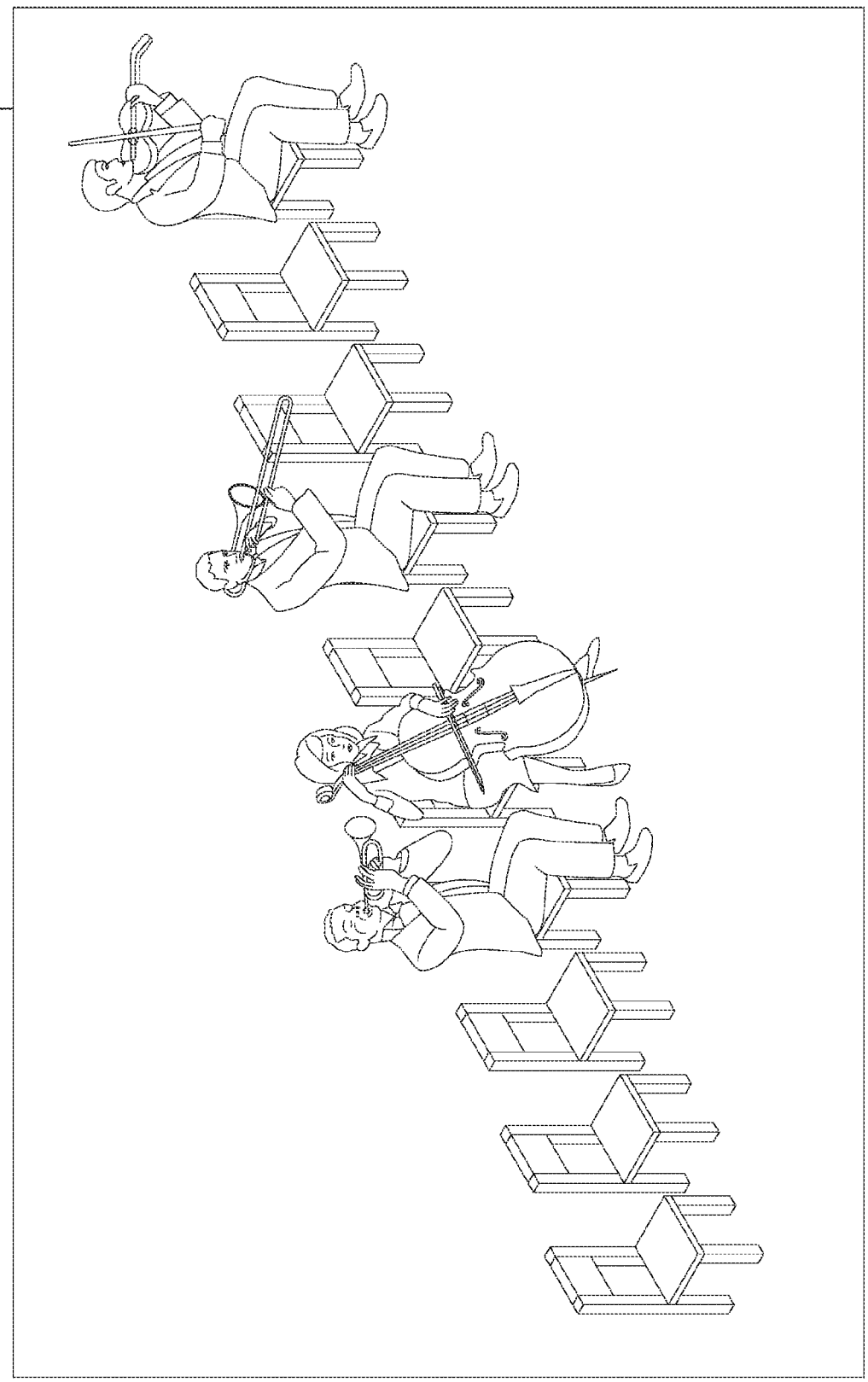
Figure 4C:
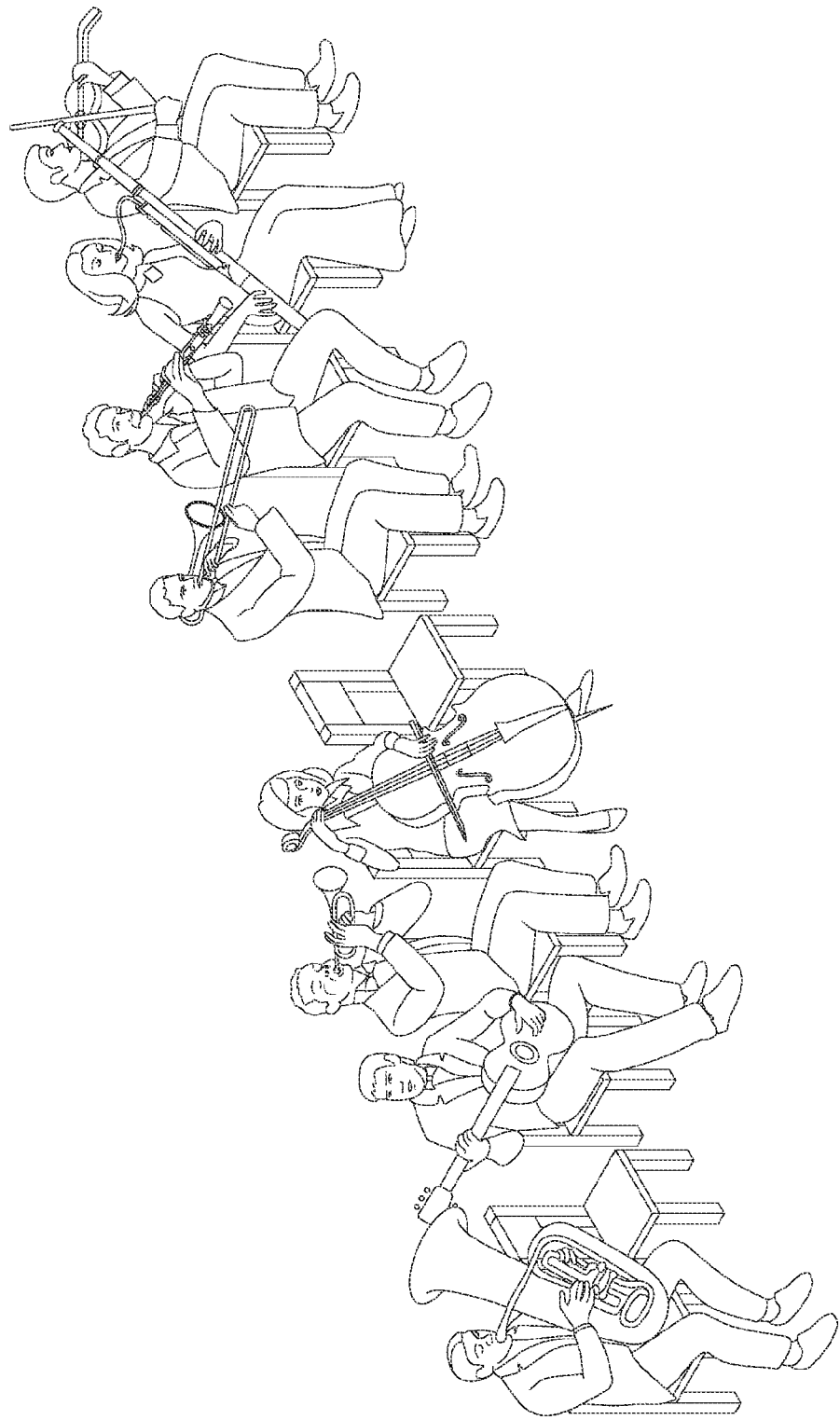

It should also be appreciated that, in embodiments in which the musical game is displayed, the representation of the musical composition associated with the musical game may be displayed in any suitable manner. FIGS. 4A, 4B, and 4C illustrate screen shots of a play of another example of the musical game. In this example, the musical composition is an instrumental. Upon initiation of the musical game, the gaming system displays an orchestra pit including a plurality of chairs, each of which represents a different musical instrument. An empty chair represents that the musical instrument associated with that chair is locked, while a full chair (i.e., a chair having a person seated and playing a musical instrument) represents that the musical instrument associated with that chair is unlocked. As shown in FIG. 4A, initially, the trumpet is unlocked and the remaining musical instruments are locked. As shown in FIG. 4B, after a period of time, three additional musical instruments are unlocked. As shown in FIG. 4C, in this example, upon completion of the musical game all but two musical instruments are unlocked.

Figure 5A:
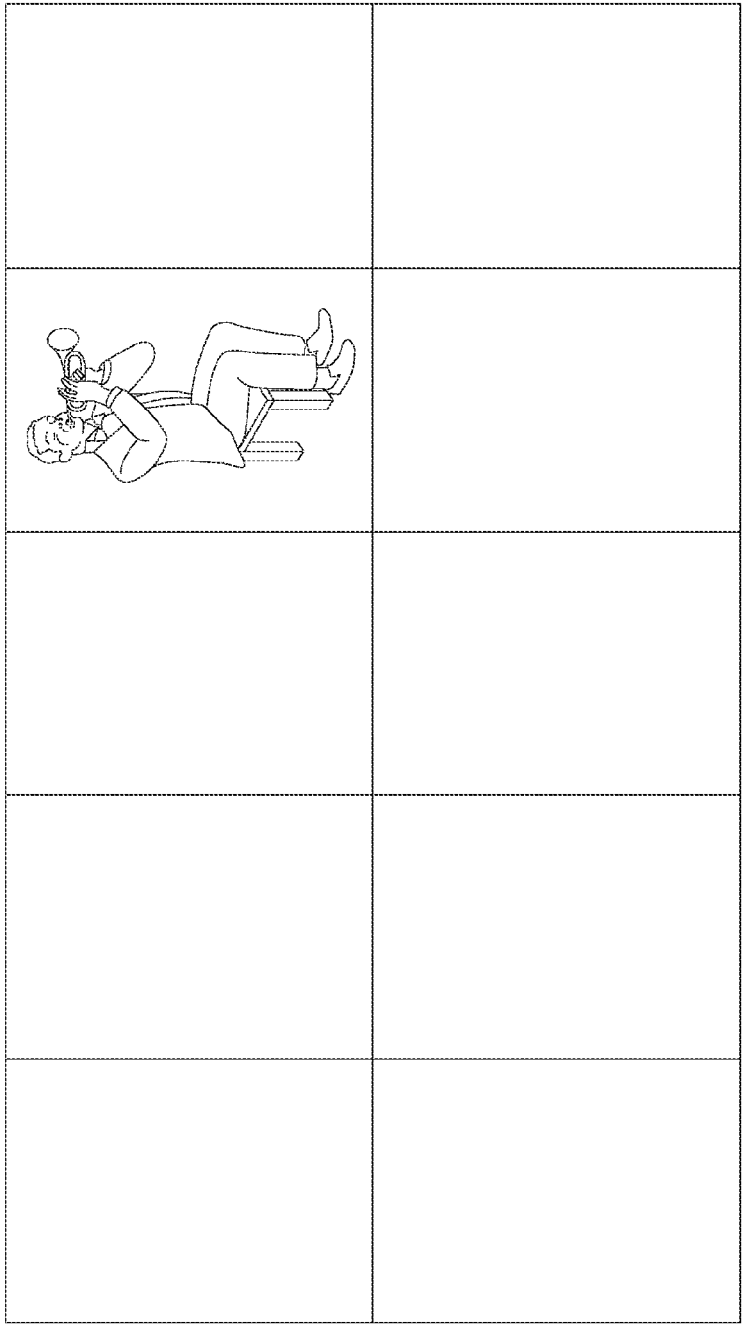
Figure 5B:
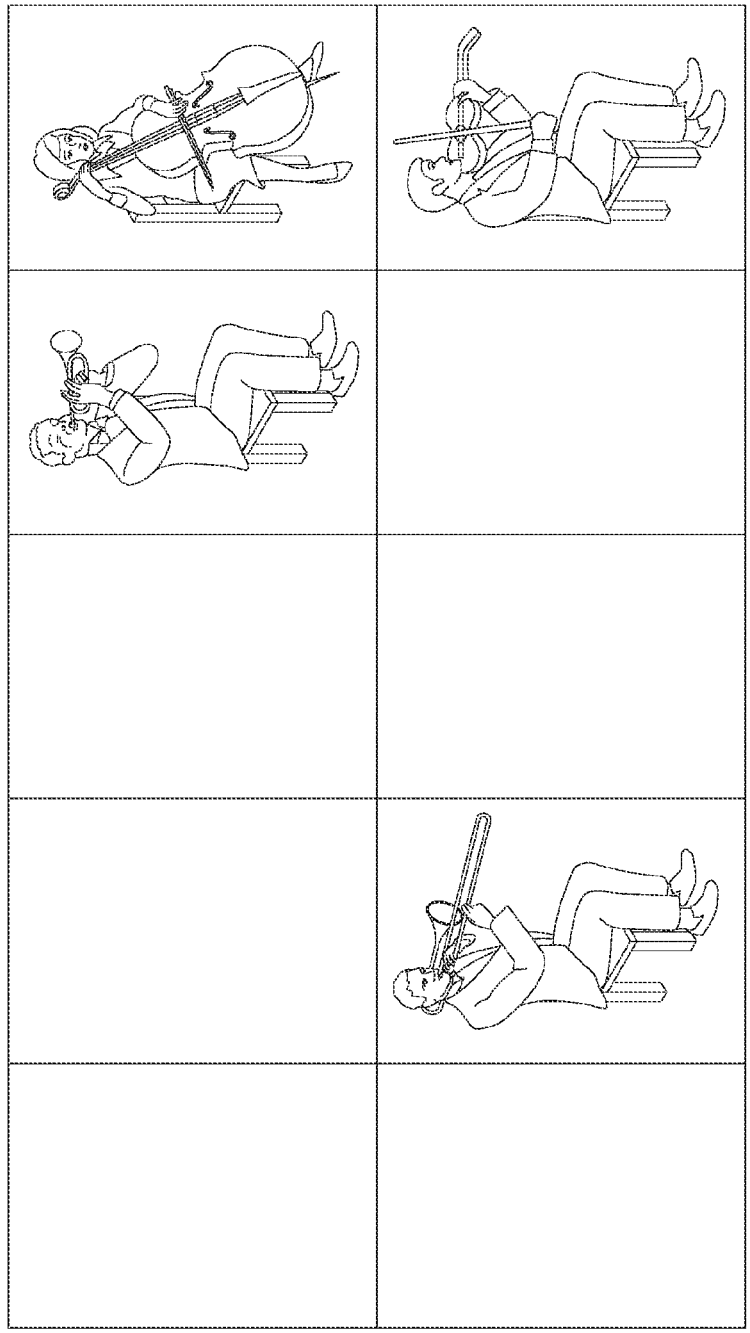
Figure 6B:
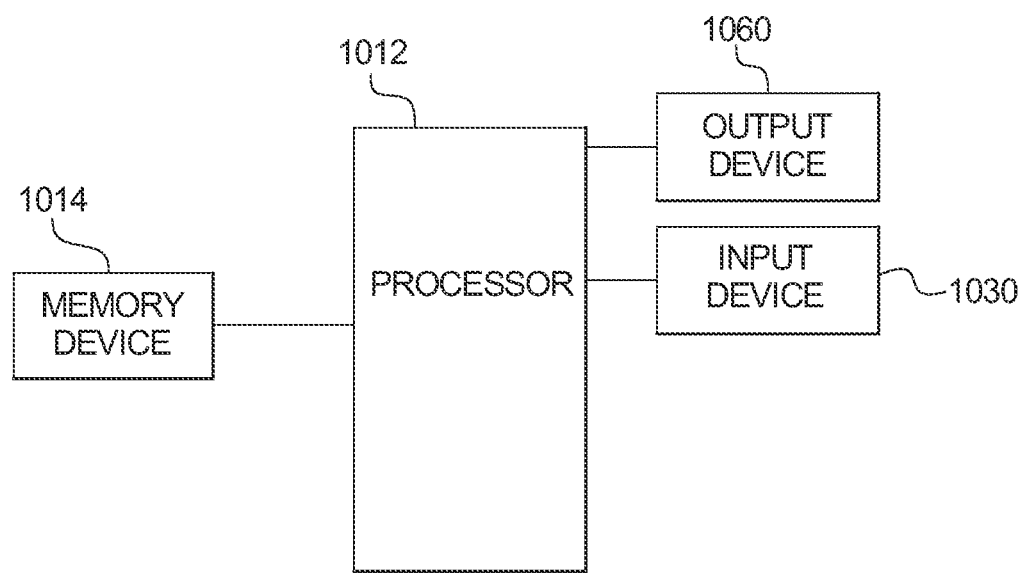
FIG. 6B is a schematic block diagram of an example electronic configuration of the gaming system of the present disclosure.
Figure 7A:
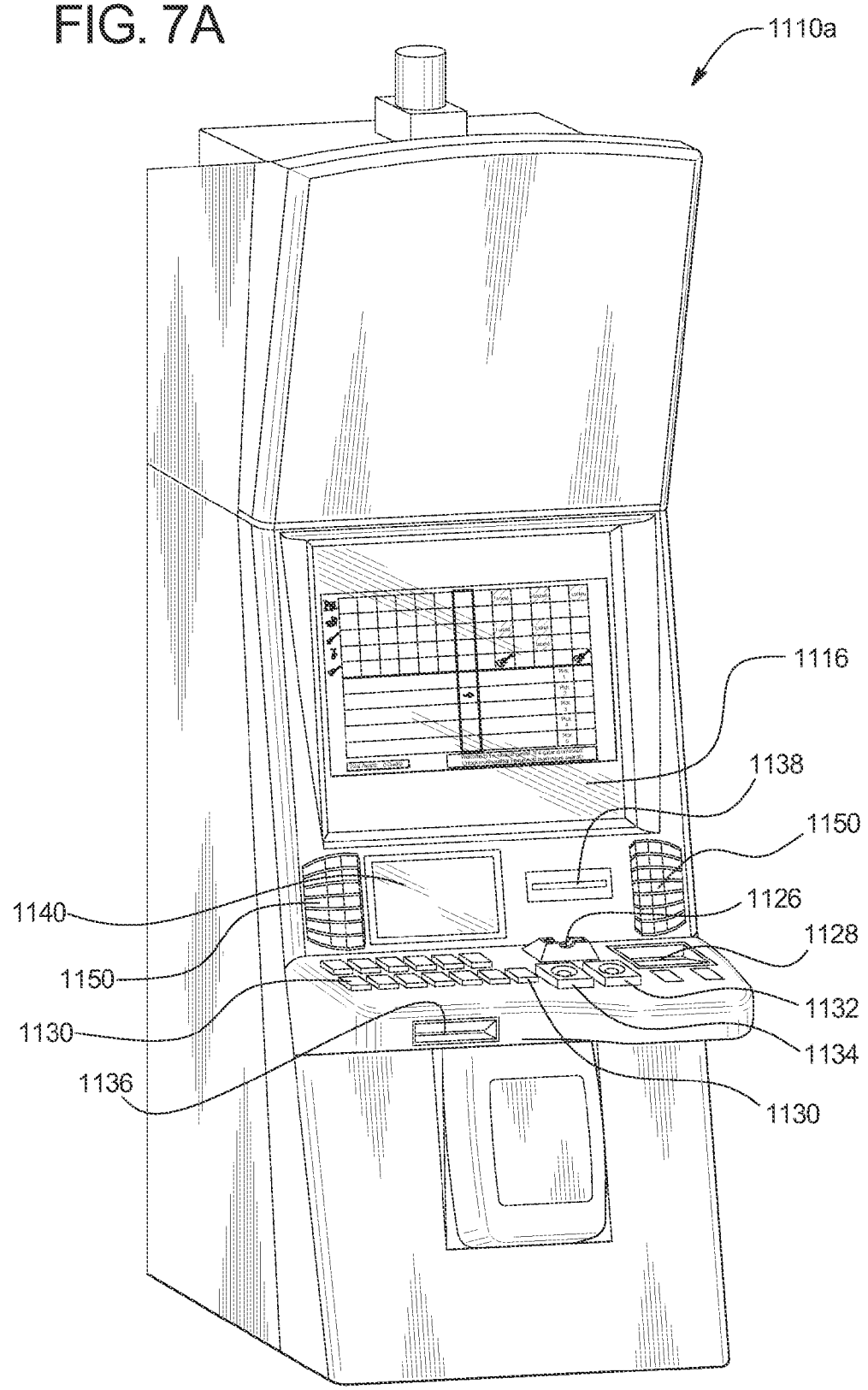
FIGS. 7A and 7B are perspective views of example alternative embodiments of the gaming system of the present disclosure.
Figure 7B:
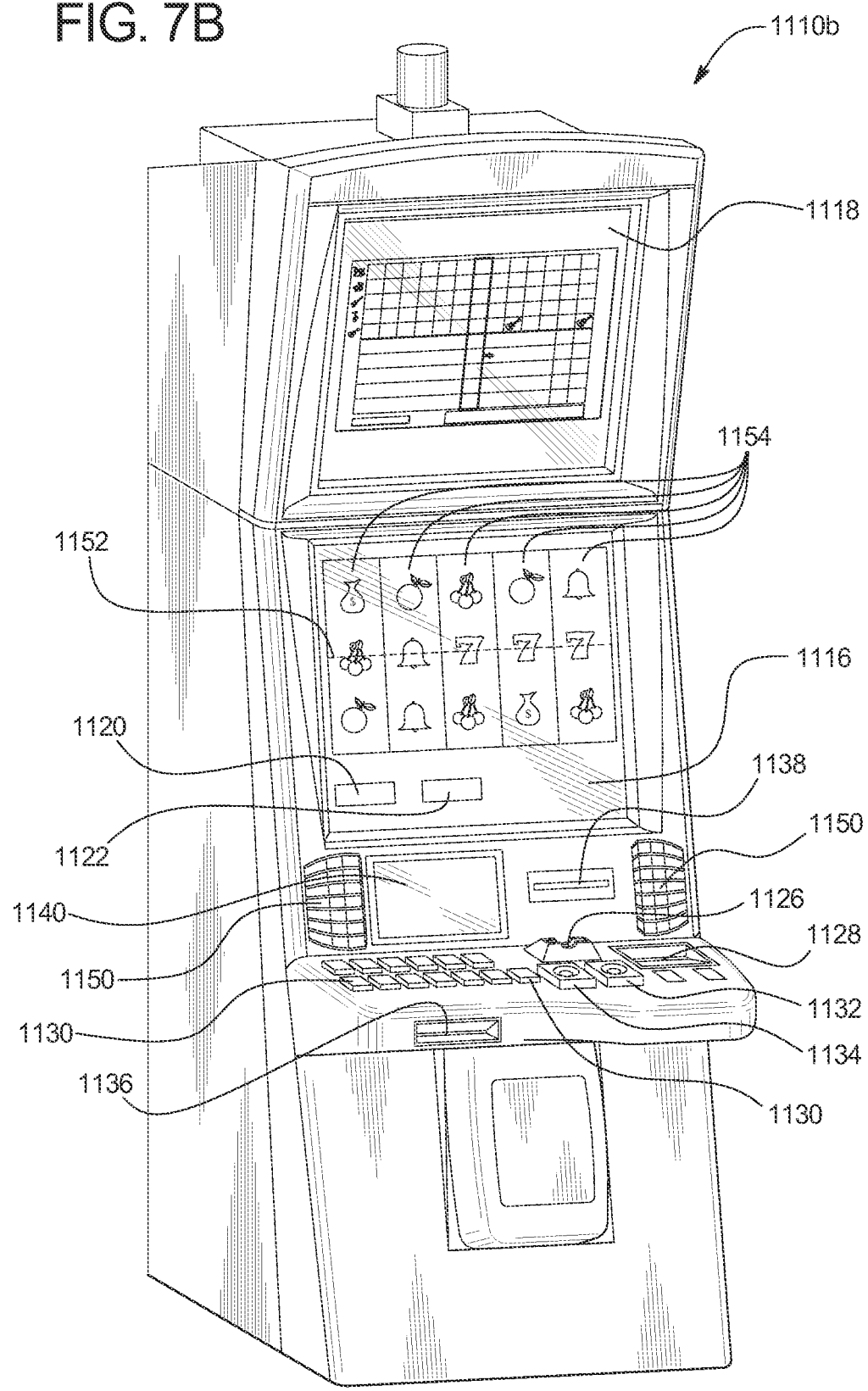

FIGS. 5A, 5B, and 5C illustrate screen shots of a play of another example of the musical game. In this example, the musical composition is an instrumental. Upon initiation of the musical game, the gaming system displays a plurality of display areas, each of which represents a different musical instrument. An empty display area represents that the musical instrument associated with that display area is locked, while a full display area (i.e., a display area displaying a person playing a musical instrument) represents that the musical instrument associated with that display area is unlocked. As shown in FIG. 5A, initially, the trumpet is unlocked and the remaining musical instruments are locked. As shown in FIG. 5B, after a period of time, three additional musical instruments are unlocked. As shown in FIG. 5C, in this example, upon completion of the musical game all but two musical instruments are unlocked.

In the embodiment described above with respect to FIGS. 2A to 2K, upon an occurrence of an instrument unlock event, the gaming system determines whether to unlock a locked musical instrument based on a combination of: (a) the location of the selector, which is positioned by the player; and (b) the gaming system's association of one of the musical instruments with each of the selections. It should be appreciated that, in other embodiments, upon an occurrence of an instrument unlock event, the gaming system determines whether to unlock a locked musical instrument based on: (a) a random determination; (b) weighted probabilities; (c) player choice; (d) a quantity of the musical instruments that are locked; (e) an amount of time remaining for the play of the musical game; (f) the position of selector symbols following a free spin of a plurality of reels (e.g., each instrument unlock event is a free spin of a 5×5 set of reels, wherein the middle reel is guaranteed to generate and display exactly one selector symbol); (g) the result of a single five-high reel spin that determines the position of the selector; (h) in a multiplayer embodiment, sequential selections by different players of electronic gaming machines (EGMs) in a given bank of EGMs; and/or (i) any suitable event(s) or any suitable factor(s).

In one embodiment, the gaming system provides an instrument unlock event periodically. That is, in this embodiment, the gaming system provides an instrument unlock event at designated intervals during the play of the musical game. In another embodiment, the gaming system randomly provides instrument unlock events during the play of the musical game. In a further embodiment, the gaming system provides instrument unlock events at predetermined times during the play of the musical game. In one embodiment, the gaming system provides more instrument unlock events if the player has failed to unlock at least a designated quantity (such as one) of locked instruments following a designated quantity of instrument unlock events. In another embodiment, the gaming system always provides enough instrument unlock events such that it is possible to unlock all of the locked instruments during a single play of the musical game. In other embodiments, however, the gaming system does not necessarily provide enough instrument unlock events such that it is possible to unlock all of the locked instruments during a single play of the musical game.

In certain embodiments, upon an occurrence of an instrument unlock event, the gaming system determines whether to unlock any locked musical instruments based on an outcome of a spin of a plurality of reels including a plurality of symbols. In one such embodiment, the gaming system provides a spin of the reels (i.e., provides an instrument unlock event) at designated intervals. If the outcome of the spin of the reels is a designated outcome, the gaming system unlocks at least one locked musical instrument. In one example, the designated outcome is a designated symbol or a combination of symbols appearing on the reels. In another example, the designated outcome is a designated sub-symbol or a designated combination of sub-symbols appearing on the reels. In another such embodiment, the gaming system provides any awards for any winning symbol combinations resulting from the spin of the reels in addition to unlocking any locked symbols.

In the example embodiment described above with respect to FIGS. 2A to 2K, upon an occurrence of an instrument unlock event, the gaming system unlocks a locked musical instrument if the picked musical instrument is locked. In other embodiments, however, upon an occurrence of an instrument unlock event, the gaming system determines whether to unlock any locked musical instruments based on a quantity of times that musical instrument has been picked. In one example, the gaming system unlocks a locked musical instrument if that musical instrument has been picked two times, once upon the occurrence of each of two instrument unlock events. The number of picks required to unlock a given locked musical instrument may be based on a value of that locked musical instrument. For instance, the more valuable a locked musical instrument is (e.g., the higher the award associated with that locked musical instrument), the more picks required to unlock that locked musical instrument. In various embodiments, when a designated instrument unlock event occurs, the gaming system: (a) enables the player to choose one of the locked instruments, and unlocks the chosen locked musical instrument; (b) automatically unlocks all locked musical instruments; (c) automatically unlocks a least valuable locked musical instrument; (d) automatically unlocks a most valuable locked musical instrument; and/or (e) automatically unlocks a plurality of locked musical instruments.

In various embodiments, the musical game is associated with a modifier triggering event. When the modifier triggering event occurs, the gaming system provides a modifier, such as a multiplier, for a designated period (such as the remainder of the play of the musical game). The gaming system employs the modifier to modify any awards won while the modifier is active. In certain such embodiments, the gaming system modifies any sounds associated with the musical instruments that are produced by the gaming device upon an occurrence of an instrument playing event when the modifier is active. For example, the gaming system may amplify or distort the sounds to emphasize of indicate that the modifier is active.

In certain embodiments, the musical game is associated with a rewind triggering event. When the rewind triggering event occurs, the gaming system "rewinds" the musical composition such that a previously-played portion of the musical composition is repeated. That is, upon an occurrence of the rewind triggering event, the gaming system provides one or more instrument playing events that the gaming system already provided for the play of the musical game. This enables the player to achieve a greater total award by providing awards that have already been achieved and by providing awards associated with musical instruments that were locked when that portion of the musical composition was initially produced by the gaming system (i.e., that were locked when the instrument playing event(s) first occurred).

In other embodiments, the musical game is associated with a pause triggering event. When the pause triggering event occurs, the gaming system stops movement of the music area for a designated period while continuing movement of the selection area. That is, the gaming system stops providing instrument playing events for the designated period. This provides more opportunity for instrument unlock events to occur before the play of the musical game ends. In another variation, the musical game is associated with a slow motion triggering event. When the slow motion triggering event occurs, the gaming system slows the rate at which the music area scrolls while continuing and not changing the rate of movement of the selection area. That is, the gaming system slows the rate at which it provides instrument playing events. This provides more opportunity for instrument unlock events to occur before the play of the musical game ends. In another variation, the musical game is associated with a speed up triggering event. When the speed up triggering event occurs, the gaming system speeds the rate at which the selection area scrolls while continuing and not changing the rate of movement of the music area. That is, the gaming system speeds the rate at which it provides instrument unlock events. This provides more opportunity for instrument unlock events to occur before the play of the musical game ends.

In one embodiment, when an instrument playing event occurs, the gaming system produces the at least one sound associated with each musical instrument associated with that instrument playing event, regardless of whether that musical instrument is locked or unlocked. If that instrument is unlocked, the gaming system also provides the award associated with that musical instrument. If that instrument is locked, however, the gaming system does not provide the award associated with that musical instrument. Thus, in this embodiment, the gaming system produces the at least one sounds associated with all musical instruments associated with an instrument playing event when that instrument playing event occurs, but provides the awards associated with the unlocked musical instruments and not the awards associated with the locked musical instruments.

In another embodiment, when an instrument playing event occurs, the gaming system produces the at least one sound associated with each musical instrument associated with that instrument playing event, regardless of whether that musical instrument is locked or unlocked. If that instrument is locked, however, the gaining system produces a muffled, muted, or otherwise modified version of that at least one sound. For instance, the gaming system produces the sounds associated with locked instruments quieter than those associated with unlocked instruments. Additionally, if that instrument is unlocked, the gaming system also provides the award associated with that musical instrument. If that instrument is locked, however, the gaming system does not provide the award associated with that musical instrument. Thus, in this embodiment, the gaming system produces some version of the at least one sound associated with each musical instrument associated with an instrument playing event when that instrument playing event occurs, but provides the awards associated with the unlocked musical instruments and not the awards associated with the locked musical instruments.

In one embodiment, the musical game is played in conjunction with the primary wagering game. In this embodiment, a play of the musical game initiates when the player initiates a play of the primary wagering game. The musical game is initially associated with one or more locked musical instruments and one or more instrument playing events. As explained above, the player may unlock the locked instruments upon the occurrence of instrument unlock events associated with the play of the primary wagering game and/or the play of the musical game. The gaming system provides those same instrument playing events for each play of the primary wagering game until each of the musical instruments is unlocked. After each of the musical instruments is unlocked, the gaming system provides the musical game with another set of instrument playing events associated with at least one locked instrument. Thus, in this embodiment, the gaming system "loops" the same instrument playing events for each play of the primary wagering game until each of the musical instruments associated with those instrument playing events is unlocked.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers; tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers; or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an Internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internee network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
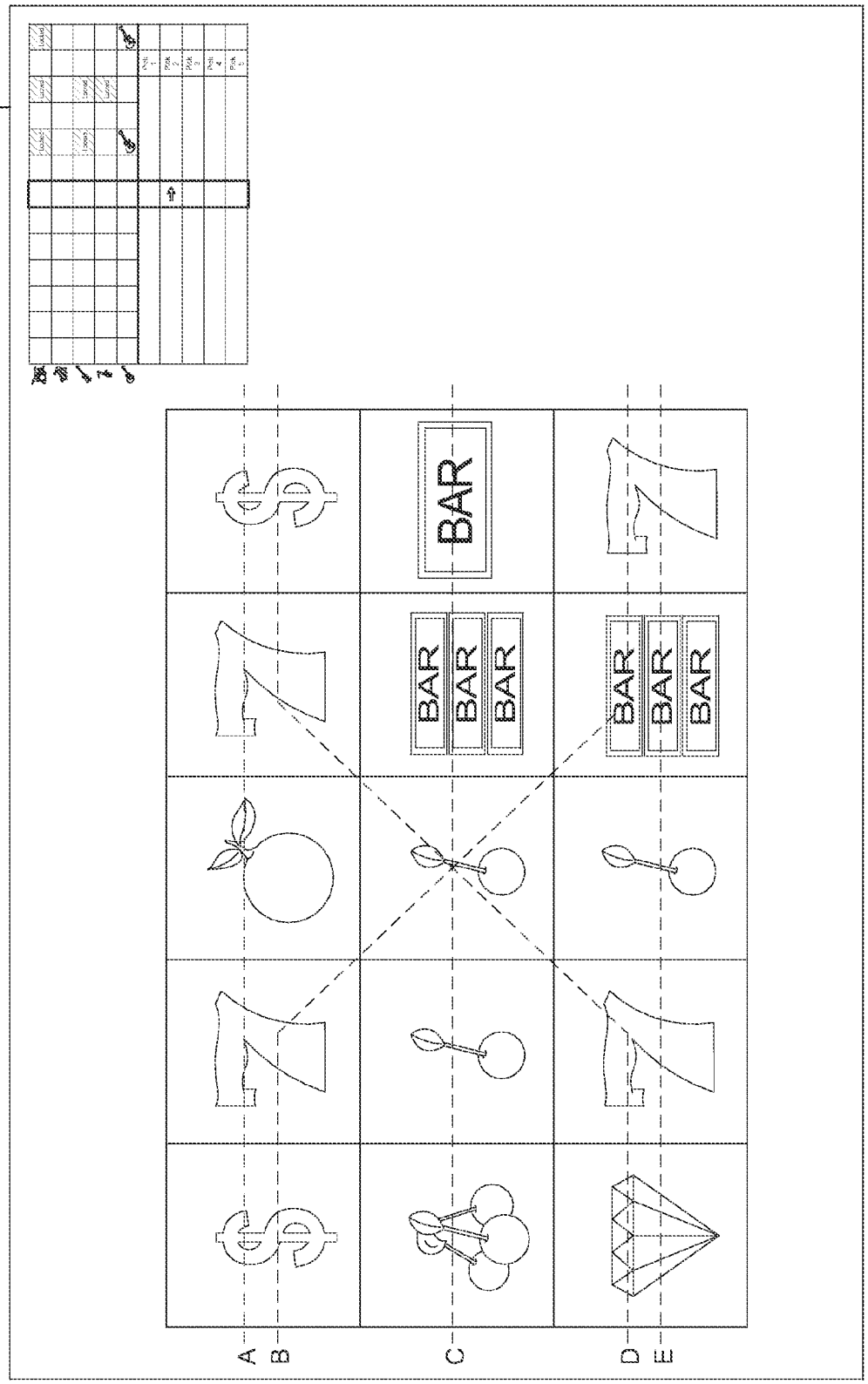
FIG. 3B illustrates a screen shot of another embodiment of the gaming system of the present disclosure providing a play of another example of the musical game in association with play of a slot game.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 43 illustrate example EGMs that each include the following payment devices: (a) a combined bill and ticket acceptor 2128, and (b) a coin slot 2126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 2132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 2134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 2138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 3A includes a central display device 2116, a player tracking display 2140, a credit display 1120, and a bet display 1122. The example EGM illustrated in FIG. 3B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable. EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 200810176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
at least one processor;
at least one display device;
at least one input device;
at least one output device; and
at least one memory device storing a plurality of instructions which, when executed by the at least one processor, cause the at least one processor to operate with the at least one display device and the at least one input device to:
(a) provide a play of a musical game associated with:
(i) a plurality of different musical instruments, one or more of the musical instruments initially being in an unlocked state and one or more of the musical instruments initially being in a locked state; and
(ii) a plurality of different instrument playing events each associated with one or more of the musical instruments, wherein at least one of the instrument playing events is not associated with at least one of the musical instruments; and
(b) for said play of the musical game:
(i) upon an occurrence of one of the instrument playing events:
(1) for each of the one or more musical instruments associated with said instrument playing event:
(A) if said musical instrument is in the unlocked state, produce at least one sound associated with said musical instrument and provide an award associated with said musical instrument; and
(B) if said musical instrument is in the locked state, not produce the at least one sound associated with said musical instrument and not provide the award associated with said musical instrument; and
(2) for each of any musical instruments not associated with said instrument playing event, not produce at least one sound associated with said musical instrument and not provide an award associated with said musical instrument regardless of whether said musical instrument is in the locked state or the unlocked state; and
(ii) upon an occurrence of an instrument unlock event, if any of the musical instruments are in the locked state:
(A) determine whether to unlock at least one of the musical instruments in the locked state;
(B) if it is determined to unlock at least one of the musical instruments in the locked state, change the state of at least one of the musical instruments in the locked state from the locked state to the unlocked state; and
(C) if it is determined not to unlock any of the musical instruments in the locked state, not change the state of any of the musical instruments in the locked state from the locked state to the unlocked state.

2. The gaming system of claim 1, wherein the plurality of instructions, when executed by the at least one processor, cause the at least one processor to, for said play of the musical game, provide the instrument playing events in a designated order.

3. The gaming system of claim 2, wherein the designated order is determined based on a musical composition.

4. The gaming system of claim 1, wherein the musical game is associated with a plurality of instrument unlock events.

5. The gaming system of claim 4, wherein the plurality of instructions, when executed by the at least one processor, cause the at least one processor to provide the instrument unlock events in a designated order.

6. The gaming system of claim 4, wherein the plurality of instructions, when executed by the at least one processor, cause the at least one processor to provide the instrument unlock events at designated intervals.

7. The gaming system of claim 1, wherein the plurality of instructions, when executed by the at least one processor, cause the at least one processor to, upon the occurrence of the instrument unlock event, if any of the musical instruments are in the locked state, provide a spin of a plurality of reels and determine whether to unlock at least one of the musical instruments in the locked state based on an outcome of said spin of the reels.

8. The gaming system of claim 1, wherein the plurality of instructions, when executed by the at least one processor, cause the at least one processor to, upon the occurrence of the instrument unlock event, if any of the musical instruments are in the locked state, determine whether to unlock at least one of the musical instruments in the locked state based at least in part on a player input.

9. A method of operating a gaming system, said method comprising:
providing a play of a musical game associated with:

(i) a plurality of different musical instruments, one or more of the musical instruments initially being in an unlocked state and one or more of the musical instruments initially being in a locked state; and (ii) a plurality of different instrument playing events each associated with one or more of the musical instruments, wherein at least one of the instrument playing events is not associated with at least one of the musical instruments; and for said play of the musical game:

(i) upon an occurrence of one of the instrument playing events:

(1) for each of the one or more musical instruments associated with said instrument playing event:

(A) if said musical instrument is in the unlocked state, causing at least one processor to execute a plurality of instructions stored in at least one memory device to operate with at least one output device to produce at least one sound associated with said musical instrument and providing an award associated with said musical instrument; and (B) if said musical instrument is in the locked state, causing the at least one processor to execute the plurality of instructions to operate with the at least one output device to not produce the at least one sound associated with said musical instrument and not providing the award associated with said musical instrument; and (2) for each of any musical instruments not associated with said instrument playing event, causing the at least one processor to execute the plurality of instructions to operate with the at least one output device to not produce at least one sound associated with said musical instrument and not providing an award associated with said musical instrument regardless of whether said musical instrument is in the locked state or the unlocked state; and (ii) upon an occurrence of an instrument unlock event, if any of the musical instruments are in the locked state, causing at least one processor to execute the plurality of instructions to:

(A) determine whether to unlock at least one of the musical instruments in the locked state;

(B) if it is determined to unlock at least one of the musical instruments in the locked state, change the state of at least one of the musical instruments in the locked state from the locked state to the unlocked state; and (C) if it is determined not to unlock any of the musical instruments in the locked state, not change the state of any of the musical instruments in the locked state from the locked state to the unlocked state.

10. The method of claim 9, which includes providing the instrument playing events in a designated order.

11. The method of claim 10, wherein the designated order is determined based on a musical composition.

12. The method of claim 9, wherein the musical game is associated with a plurality of instrument unlock events.

13. The method of claim 12, which includes providing the instrument unlock events in a designated order.

14. The method of claim 12, which includes providing the instrument unlock events at designated intervals.

15. The method of claim 9, which includes causing the at least one processor to execute the plurality of instructions to, upon the occurrence of the instrument unlock event, if any of the musical instruments are in the locked state, provide a spin of a plurality of reels and determine whether to unlock at least one of the musical instruments in the locked state based on an outcome of said spin of the reels.

16. The method of claim 9, which includes causing the at least one processor to execute the plurality of instructions to, upon the occurrence of the instrument unlock event, if any of the musical instruments are in the locked state, determine whether to unlock at least one of the musical instruments in the locked state based at least in part on a player input.

17. The method of claim 9, which is provided through a data network.

18. The method of claim 17, wherein the data network is an internet.

19. A non-transitory computer readable medium storing a plurality of instructions which, when executed by at least one processor, cause the at least one processor to:

(a) provide a play of a musical game associated with:

(i) a plurality of different musical instruments, one or more of the musical instruments initially being in an unlocked state and one or more of the musical instruments initially being in a locked state; and (ii) a plurality of different instrument playing events each associated with one or more of the musical instruments, wherein at least one of the instrument playing events is not associated with at least one of the musical instruments; and (b) for said play of the musical game:

(i) upon an occurrence of one of the instrument playing events:

(1) for each of the one or more musical instruments associated with said instrument playing event:

(A) if said musical instrument is in the unlocked state, cause an output device to produce at least one sound associated with said musical instrument and provide an award associated with said musical instrument; and (B) if said musical instrument is in the locked state, not cause the output device to produce the at least one sound associated with said musical instrument and not provide the award associated with said musical instrument; and (2) for each of any musical instruments not associated with said instrument playing event, not produce at least one sound associated with said musical instrument and not provide an award associated with said musical instrument regardless of whether said musical instrument is in the locked state or the unlocked state; and (ii) upon an occurrence of an instrument unlock event, if any of the musical instruments are in the locked state:

(A) determine whether to unlock at least one of the musical instruments in the locked state;

(B) if it is determined to unlock at least one of the musical instruments in the locked state, change the state of at least one of the musical instruments in the locked state from the locked state to the unlocked state; and (C) if it is determined not to unlock any of the musical instruments in the locked state, not change the state of any of the musical instruments in the locked state from the locked state to the unlocked state.

20. The non-transitory computer readable medium of claim 19, wherein the plurality of instructions, when executed by the at least one processor, cause the at least one processor to, for said play of the musical game, provide the instrument playing events in a designated order.

21. The non-transitory computer readable medium of claim 20, wherein the designated order is determined based on a musical composition.

22. The non-transitory computer readable medium of claim 19, wherein the musical game is associated with a plurality of instrument unlock events.

23. The non-transitory computer readable medium of claim 22, wherein the plurality of instructions, when executed by the at least one processor, cause the at least one processor to provide the instrument unlock events in a designated order.

24. The non-transitory computer readable medium of claim 22, wherein the plurality of instructions, when executed by the at least one processor, cause the at least one processor to provide the instrument unlock events at designated intervals.

25. The non-transitory computer readable medium of claim 19, wherein the plurality of instructions, when executed by the at least one processor, cause the at least one processor to, upon the occurrence of the instrument unlock event, if any of the musical instruments are in the locked state, provide a spin of a plurality of reels and determine whether to unlock at least one of the musical instruments in the locked state based on an outcome of said spin of the reels.

26. The non-transitory computer readable medium of claim 19, wherein the plurality of instructions, when executed by the at least one processor, cause the at least one processor to, upon the occurrence of the instrument unlock event, if any of the musical instruments are in the locked state, determine whether to unlock at least one of the musical instruments in the locked state based at least in part on a player input.

* * * * *